(12) United States Patent
Palumbo et al.

(10) Patent No.: US 10,573,911 B2
(45) Date of Patent: Feb. 25, 2020

(54) SOFC SYSTEM FORMED WITH MULTIPLE THERMALLY CONDUCTIVE PATHWAYS

(71) Applicant: Upstart Power, Inc., Southborough, MA (US)

(72) Inventors: Nathan Palumbo, West Boylston, MA (US); Joshua Persky, Berlin, MA (US)

(73) Assignee: Upstart Power, Inc., Southborough, MA (US)

( * ) Notice: Subject to any disclaimer, the term of this patent is extended or adjusted under 35 U.S.C. 154(b) by 384 days.

(21) Appl. No.: 15/287,402

(22) Filed: Oct. 6, 2016

(65) Prior Publication Data
US 2017/0110748 A1    Apr. 20, 2017

Related U.S. Application Data

(60) Provisional application No. 62/243,960, filed on Oct. 20, 2015.

(51) Int. Cl.
*H01M 8/04955*    (2016.01)
*H01M 8/0432*    (2016.01)
(Continued)

(52) U.S. Cl.
CPC ... *H01M 8/04955* (2013.01); *H01M 8/04365* (2013.01); *H01M 8/04753* (2013.01);
(Continued)

(58) Field of Classification Search
CPC .............. H01M 8/04067; H01M 8/12; H01M 8/04955; H01M 8/04753; H01M 8/0618;
(Continued)

(56) References Cited

U.S. PATENT DOCUMENTS 3,162,411 A    12/1964   Duggan
3,372,960 A    3/1968    Fisher
(Continued)

FOREIGN PATENT DOCUMENTS

EP    1202366 A2    5/2002
EP    1202366       8/2007
(Continued)

OTHER PUBLICATIONS

Baukal Jr., The John Zink Hamworthy Combustion Handbook, Second Edition: vol. 3—Applications, 2013, pp: 321-322, vol. 3, ISBN: 1439839662, CRC Press.
(Continued)

*Primary Examiner* — Osei K Amponsah
(74) *Attorney, Agent, or Firm* — Burns & Levinson, LLP; George N. Chaclas

(57) ABSTRACT

A solid oxide fuel cell (SOFC) system includes inner and outer enclosure walls each formed as an independent thermally conductive path. Each thermally conductive path comprises materials having a coefficient of thermal conductivity of greater than 100 W/m° K. The inner and outer enclosure walls are each thermally conductively coupled with an annular enclosure formed to enclose a fuel reformer module. The annular enclosure provides a fourth thermally conductive path disposed between the inner and outer enclosure walls having a coefficient of thermal conductivity of 50 W/m° K or less. A temperature sensor and thermal fuse are mounted to an outside surface of the outer enclosure. An active sensor and a passive fuse are provided to interrupt a flow of fuel into the fuel reformer when a temperature of the outer enclosure walls equal or exceed a failsafe operating temperature.

22 Claims, 8 Drawing Sheets

(51) Int. Cl.
*H01M 8/04992* (2016.01)
*H01M 8/04746* (2016.01)
*H01M 8/0612* (2016.01)
*H01M 8/124* (2016.01)

(52) U.S. Cl.
CPC ..... *H01M 8/04992* (2013.01); *H01M 8/0618* (2013.01); *H01M 2008/1293* (2013.01)

(58) Field of Classification Search
CPC ......... H01M 8/04992; H01M 8/04365; H01M 2008/1293
See application file for complete search history.

(56) References Cited

U.S. PATENT DOCUMENTS

| | | |
|---|---|---|
| 4,656,689 A | 4/1987 | Dennis |
| 4,910,100 A | 3/1990 | Nakanishi et al. |
| 4,997,726 A | 3/1991 | Akiyama et al. |
| 5,169,730 A | 12/1992 | Reichner et al. |
| 5,415,233 A | 5/1995 | Roussakis et al. |
| 5,501,472 A | 3/1996 | Brancher et al. |
| 5,732,440 A | 3/1998 | Wright |
| 5,733,675 A | 3/1998 | Dederer et al. |
| 5,750,278 A | 5/1998 | Gillett et al. |
| 5,827,620 A | 10/1998 | Kendall |
| 6,221,522 B1 | 4/2001 | Zafred et al. |
| 6,265,092 B1 | 7/2001 | Meltser et al. |
| 6,306,531 B1 | 10/2001 | Clingerman et al. |
| 6,358,640 B1 | 3/2002 | Kendall et al. |
| 6,485,852 B1 | 11/2002 | Miller et al. |
| 6,492,050 B1 | 12/2002 | Sammes |
| 6,608,463 B1 | 8/2003 | Kelly et al. |
| 6,627,339 B2 | 9/2003 | Haltiner, Jr. |
| 6,696,187 B2 | 2/2004 | Kendall et al. |
| 6,824,907 B2 | 11/2004 | Sarkar et al. |
| 6,841,284 B2 | 1/2005 | Brown et al. |
| 7,001,682 B2 | 2/2006 | Haltiner, Jr. |
| 7,008,711 B2 | 3/2006 | Pondo et al. |
| 7,014,822 B1 | 3/2006 | Shinke et al. |
| 7,195,663 B2 | 3/2007 | Edlund et al. |
| 7,226,681 B2 | 6/2007 | Florence et al. |
| 7,252,902 B2 | 8/2007 | Bram et al. |
| 7,335,432 B2 | 2/2008 | Koripella |
| 7,349,959 B2 | 3/2008 | Imamura et al. |
| 7,419,060 B2 | 9/2008 | Arthur et al. |
| 7,422,810 B2 | 9/2008 | Venkataraman et al. |
| 7,425,381 B2 | 9/2008 | Gilman et al. |
| 7,452,622 B2 | 11/2008 | Sarkar et al. |
| 7,645,535 B2 | 1/2010 | Rehg et al. |
| 7,655,337 B2 | 2/2010 | Kaye |
| 7,674,543 B2 | 3/2010 | Chiang et al. |
| 7,767,329 B2 | 8/2010 | Crumm et al. |
| 7,875,403 B2 | 1/2011 | Finnerty |
| 7,887,959 B2 | 2/2011 | Gallet et al. |
| 7,943,263 B2 | 5/2011 | Brantley et al. |
| 8,026,011 B2 | 9/2011 | Ooshima et al. |
| 8,043,760 B2 | 10/2011 | Okamoto et al. |
| 8,071,251 B2 | 12/2011 | Eshraghi et al. |
| 8,163,433 B2 | 4/2012 | Zafred et al. |
| 8,178,256 B2 | 5/2012 | Ogawa et al. |
| 8,188,382 B2 | 5/2012 | Monden et al. |
| 8,197,249 B1 | 6/2012 | Nguyen |
| 8,197,976 B2 | 6/2012 | Poshusta et al. |
| 8,273,485 B2 | 9/2012 | Schaevitz et al. |
| 8,304,122 B2 | 11/2012 | Poshusta et al. |
| 8,343,684 B2 | 1/2013 | Devoe et al. |
| 8,377,604 B2 | 2/2013 | Nakajima et al. |
| 8,389,180 B2 | 3/2013 | Hawkes et al. |
| 8,530,114 B2 | 9/2013 | Kirkwood |
| 8,614,023 B2 | 12/2013 | Poshusta et al. |
| 8,628,891 B2 | 1/2014 | Brown et al. |
| 8,652,707 B2 | 2/2014 | Finnerty et al. |
| 8,658,327 B2 | 2/2014 | Mook et al. |
| 8,714,563 B2 | 5/2014 | Yamamoto et al. |
| 8,715,879 B2 | 5/2014 | Devoe et al. |
| 9,056,768 B2 | 6/2015 | Langan |
| 9,065,159 B2 | 6/2015 | Chan et al. |
| 9,105,917 B2 | 8/2015 | Kuehn et al. |
| 9,190,673 B2 | 11/2015 | Venkataraman et al. |
| 9,343,758 B2 | 5/2016 | Poshusta et al. |
| 9,452,475 B2 | 9/2016 | Armstrong et al. |
| 9,500,116 B2 | 11/2016 | Foos et al. |
| 9,559,364 B2 | 1/2017 | Wood et al. |
| 9,831,043 B2 | 11/2017 | Roumi et al. |
| 9,863,557 B2 | 1/2018 | Haynes et al. |
| 2003/0054215 A1 | 3/2003 | Doshi et al. |
| 2004/0086765 A1* | 5/2004 | Florence ........... H01M 8/04014 429/434 |
| 2005/0053819 A1 | 3/2005 | Paz |
| 2005/0081444 A1 | 4/2005 | Anumakonda et al. |
| 2005/0217991 A1 | 10/2005 | Dahlquist, Jr. |
| 2005/0269234 A1 | 12/2005 | Gore et al. |
| 2006/0127725 A9 | 6/2006 | Sarkar et al. |
| 2007/0099065 A1 | 5/2007 | Rawson et al. |
| 2007/0237998 A1 | 10/2007 | Armstrong et al. |
| 2008/0118803 A1 | 5/2008 | Dekker et al. |
| 2008/0211226 A1 | 9/2008 | Whitney |
| 2009/0044971 A1 | 2/2009 | Kataoka et al. |
| 2009/0050680 A1 | 2/2009 | Martin et al. |
| 2009/0142639 A1 | 6/2009 | Gregorski |
| 2010/0044971 A1 | 2/2010 | Henry |
| 2010/0203399 A1 | 8/2010 | Poshusta et al. |
| 2010/0305762 A1* | 12/2010 | Chan .................. H01M 8/0267 700/282 |
| 2012/0077095 A1* | 3/2012 | Roumi .................. H01G 11/02 429/405 |
| 2013/0040216 A1 | 2/2013 | Poshusta et al. |
| 2014/0106246 A1 | 4/2014 | Poshusta et al. |
| 2015/0004528 A1 | 1/2015 | Palumbo et al. |
| 2016/0099476 A1 | 4/2016 | Palumbo et al. |
| 2017/0110748 A1 | 4/2017 | Palumbo et al. |

FOREIGN PATENT DOCUMENTS

| | | |
|---|---|---|
| EP | 1966850 | 9/2008 |
| JP | 2006019119 | 1/2006 |
| JP | 2009140695 | 6/2009 |
| JP | 2011-129280 * | 6/2011 |
| JP | 2011129280 | 6/2011 |
| WO | WO2007/076440 | 7/2007 |
| WO | 2013/088122 | 6/2013 |
| WO | WO-2013088122 A1 | 6/2013 |
| WO | 2018/031742 | 2/2018 |

OTHER PUBLICATIONS

International Search Report and Written Opinion, dated Jun. 29, 2016, PCT/US2014/059447.
Burke et al., Development of Passive Fuel Cell Thermal Management Materials, pp. 1-13, Dec. 2010.
HHO 3/8" Flashback Arrestor Hydrogen Fuel Cell Generator, Printed Jan. 19, 2015.
K. Burke et al., "Development of Passive Fuel Cell Thermal Management Materials", May 12, 2009, pp. 1-13.
ENrG Incorporated, Hexim—Improved Thermal Management of SOFC, MCFC, PEM and HTPEM Fuel Cell and Reformer Systems, Apr. 16, 2014, 1 page.
Lessing, A review of sealing technologies applicable to solid oxide electrolysis cells, Journal of Materials Science, 2007, pp. 3465-3476, vol. 42, No. 10.
M.K. Mahapatra et al., "Glass-based seals for solid oxide fuel and electrolyzer cells—A review", Materials Science and Engineering R, 67 (2010), pp. 65-85.
International Search Report for Application No. PCT/US2017/046246 dated Dec. 14, 2017, 6 pages.
International Search Report for Application No. PCT/US2017/055554 dated Dec. 14, 2017, 7 pages.

(56) References Cited

OTHER PUBLICATIONS

International Search Report and Written Opinion for International PCT Application No. PCT/US2019/019183, dated May 2, 2019, 13 pages.

* cited by examiner

SOFC SYSTEM FORMED WITH MULTIPLE THERMALLY CONDUCTIVE PATHWAYS

1. CROSS REFERENCE TO RELATED U.S. PATENT APPLICATIONS

The present application claims priority under 55 U.S.C. § 119(e) to provisional U.S. Patent Application Ser. No. 62/243,960 entitled Improved CPDX Fuel Reformer and SOFC System, filed Oct. 20, 2015 which is incorporated herein by reference in its entirety and for all purposes.

2. COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Protonex Technology Corporation 2015.

3. BACKGROUND OF THE INVENTION

3.1 Field of the Invention

The exemplary, illustrative technology described herein relates to Solid Oxide Fuel Cell (SOFC) systems and particularly to structural features and methods of making enclosure walls from thermally conductive materials and forming the enclosures to provide thermally conductive pathways designed to distribute thermal energy by thermal conduction in a desired manner. More specifically the technology relates to thermal energy management in an SOFC system by providing thermally conductive pathways configured to improve operating performance, safety, and reliability.

3.2 The Related Art

Conventional solid oxide fuel cell (SOFC) systems used to generate electrical energy by an electrochemical process that typically utilized gas to gas heat exchangers to transfer thermal energy from exhaust gases to incoming air. Example embodiments are disclosed in U.S. Pat. No. 8,557,451 entitled Fuel Processor for Fuel Cell System, issued Oct. 15, 2013 and in U.S. Pat. No. 8,197,976 entitled Solid Oxide Fuel Cell System with Hot Zones and Two-Stage Tail Gas Combustors. While the gas-to-gas heat exchangers transfer waste heat from exhaust gases to incoming cathode air, the overall systems operate with hot spots at the tail gas combustion chamber and other locations where fuel is being combusted.

In conventional SOFC systems, the temperature surrounding hot spots tends to exceed a safe operating temperature for many highly thermally conductive metals such as copper and aluminum. Additionally, highly thermally conductive metals such as copper and aluminum are often damaged by oxidation when exposed to oxygen rich cathode gasses used in conventional SOFC systems. This has led to reluctance in the art to use highly thermally conductive metals with conventional SOFC systems which are instead constructed with temperature resistant metals surrounding the hot spots to avoid burn through and other failures including shortened product life caused by metal oxidation. The temperature resistant metals tend to include high temperature super alloys usually comprising nickel and cobalt such as Hastelloy, Monel, Inconel, and others that are less likely to be damaged by prolonged high temperature and oxygen exposure. One problem with using high temperature super alloys is that they have a low coefficient of thermal conductivity such as less than about 40 W/m° K and more generally less than 20 W/m° K. As compared with more thermally conductive metals (e.g. aluminum and copper alloys) with a coefficient of thermal conductivity of more than 200 W/m° K, the high temperature super alloys are poorer thermal conductors. As a result heat transfer by thermal conduction in conventional SOFC enclosures is slow and the slow rate of thermal conduction tends to create permanent hot spots or temperature gradients in the overall structure of the SOFC system.

More recently SOFC systems have been constructed to promote thermal energy transfer by thermal conduction in order to reduce thermal gradients. One such system is disclosed in U.S. application Ser. No. 14/399,795 entitled SOFC-Conduction published Apr. 7, 2016 as US: 20160099476A1. This document discloses an SOFC system that is formed with inner and outer metal enclosures formed as thermally conductive pathways made from more thermally conductive metals such as aluminum and copper alloys in order to improve the rate of thermal conduction from hot spots to cooler areas of the structure. By providing a thermally conductive pathway with a higher coefficient of thermal conductivity and providing some walls with a larger thermal mass than others, thermal gradients are reduced as each different enclosure wall system tends to more rapidly normalize to a uniform temperature enabled by more rapid thermal conduction through the aluminum and copper enclosure walls which in some cases include a copper core.

Conventional SOFC systems utilize internal temperature sensors to measure instantaneous temperature at hot spot locations located inside hot zones of the SOFC system. An electric controller monitors the instantaneous temperature reported by each internal temperature sensor. If an over temperature condition is detected, the electronic controller is operable to shut down operation of the SOFC system by closing an input fuel valve. However, one problem with the use of internal sensors in a high temperature environment is that the thermal sensors can fail to provide the instantaneous internal temperature at all or can provide an inaccurate instantaneous temperature. As a result of a damaged or inaccurate internal thermal sensor an over temperature condition goes undetected and that can cause catastrophic failure such as a burn through of one of the enclosure walls. Other consequences include damage to thermal insulation surrounding hot zones and or damage to coating layers applied to internal and external enclosure wall surfaces. Even when damage due to an over temperature condition is minimal, when internal temperature sensors fail they need to be replaced. To replace a damaged internal temperature sensor the SOFC system must be disassembled and this is costly.

In view of the foregoing discussion there is a need in the art to provide an SOFC system that uses external temperature sensors to detect over temperature operating conductions that may lead to system damage or failure without relying on internal sensors. There is a further need in the art to provide a passive backup to thermal sensors that detect over temperature conditions. In particular the passive back is provided to shut down the SOFC system if the temperature sensor fails or otherwise reports an inaccurate temperature.

4. SUMMARY OF THE INVENTION

The present invention solves the above described problems of conventional solid oxide fuel systems and methods that utilize gas to gas heat exchange to manage thermal energy distribution from high temperature regions. The present invention also solves the problem of avoiding internal temperature sensors by moving a temperature sensor to the outer surface of an enclosure and provides a passive thermal fuse system operable to stop gas flow into the SOFC system in cases where the thermal sensor attached to the outer surface fails to detect an over temperature condition. The present invention enables such solutions by forming enclosure walls as thermally conductive pathways using materials that have a higher coefficient of thermal conductivity than conventional high temperature metal alloys.

In an embodiment, a solid oxide fuel cell (SOFC) system includes an SOFC stack operating in a hot zone cavity. The hot zone cavity includes at least one fuel combustion chamber and gas flow conduits for carrying exhaust gases out of the SOFC system. A hot zone enclosure is provided to enclose the hot zone cavity or cathode chamber. The hot zone enclosure includes a plurality of walls that are joined together. The hot zone wall structure is formed as a first continuous thermally conductive pathway. The first continuous thermally conductive pathway includes walls made from materials having a coefficient of thermal conductivity of 100 W/(m° K) or higher such as aluminum and copper alloys. Preferably the first continuous thermally conductive pathway includes walls made from a copper alloy having a coefficient of thermal conductivity of 140-200 W/(m° K). An intermediate enclosure is provided surrounding the hot zone enclosure. The intermediate enclosure includes a plurality of intermediate enclosure walls joined together to form a second continuous thermally conductive pathway. The second continuous thermally conductive pathway includes materials having a coefficient of thermal conductivity of 50 W/(m° K) or less and preferably 25 W/(m° K) or less and preferably comprise a super alloy comprising a metal nickel alloy that includes cobalt and or chrome and other metals.

The intermediate enclosure walls are enclosed by a plurality of outer enclosure walls joined together to form a third continuous thermally conductive pathway. The third continuous thermally conductive pathway includes materials having a coefficient of thermal conductivity of 100 W/(m° K) or higher and preferably 140-200 W/(m° K) and preferably composes an aluminum alloy.

A thermal insulation layer is disposed between the intermediate enclosure walls forming the second continuous thermally conductive pathway and the outer enclosure walls forming the third continuous thermally conductive pathway. An air gap is formed between the hot zone enclosure walls forming the first continuous thermally conductive pathway and the intermediate enclosure walls forming the second continuous thermally conductive pathway. The air gap provides a fluid conduit for exhaust gases exiting the system. An annular enclosure wall is formed as a fourth continuous thermally conductive pathway that is joined together with and thermally conductively coupled with each of the first continuous thermally conductive pathway, the second continuously conductive pathway, and the third continuously conductive pathway. The fourth continuous thermally conductive pathway includes materials having a coefficient of thermal conductivity of 50 W/(m° K) or less and preferably 25 W/(m° K) or less.

Each of the first continuous thermally conductive pathway, the second continuous thermally conductive pathway, the third continuous thermally conductive pathway, and the fourth thermally conductive pathway has a different thermal mass. The thermal mass of the fourth continuous thermally conductive pathway is less than the thermal mass of any of the first continuous thermally conductive pathway, the second continuous thermally conductive pathway, and the third continuous thermally conductive pathway.

In one embodiment the first continuous thermally conductive pathway is formed by enclosure walls made of an aluminum alloy having a coefficient of thermal conductivity of 140 W/m° K. The aluminum alloy aluminum 6061 is preferred. Portions of the hot zone enclosure are formed from a material having a coefficient of thermal conductivity of 200 W/(m° K) or greater such as a copper alloy or a composite wall formed with a copper core enclosed by a nickel or aluminum alloy outer layer.

In another embodiment a solid oxide fuel cell (SOFC) system includes an SOFC stack operating in a hot zone cavity. A hot zone enclosure formed by a plurality of walls joined together is disposed to enclose the hot zone cavity. The hot zone enclosure walls are formed as a first continuous thermally conductive pathway. An outer enclosure formed by a plurality of outer enclosure walls enclosing a region surrounding the hot zone enclosure walls. The outer enclosure walls are formed as a third thermally conductive pathway. A thermal insulation layer is disposed between the plurality of hot zone enclosure walls and the outer enclosure walls in order to reduce radiant heat transfer from the higher temperature hot zone enclosure walls to the cooler outer enclosure walls. An annular enclosure wall formed to enclose a cylindrical cavity is formed as a fourth thermally conductive pathway. The annular enclosure wall is joined together with and thermally conductively coupled with each of the first conductive pathway and the third conductive pathway providing a fourth thermally conductive pathway connected between the first and third thermally conductive pathways. Each of the first thermally conductive pathway and the third thermally conductive pathway is formed by enclosure walls made of material having a coefficient of thermal conductivity of 100 W/m° K or greater and preferably 140 to 200 W/m° K. The annular enclosure wall is formed from a material having a coefficient of thermal conductivity of 50 W/(m° K) or less and preferably 25 W/(m° K) or less. In some embodiments, any of the walls that are included in any of the first second and third thermally conductive pathways defined herein may comprise portions that are not part of the thermal conductive pathways described above, i.e. when a portion of a wall is thermally conductively isolated from the thermally conductive pathway associated with the wall. Additionally any of the first, second, and third thermally conductive pathways defined herein may comprise wall portions that have a different coefficient of thermal conductivity or thermal mass than other portions of the same thermally conductive pathway without deviating from the present invention.

The solid oxide fuel cell (SOFC) system includes an electronic controller. The electronic controller includes a digital data processor and associated digital data memory. Operating programs and digital logic control elements operating on the electronic controller along with sensors that measure temperature, gas flow rates, gas pressure and DC power output are configured to operate the SOFC system.

A fuel input module includes a fuel supply valve operable by the electronic controller. The electronic controller opens the fuel supply valve to deliver a flow of fuel to the solid oxide fuel cell system and closes the fuel supply valve to prevent a flow of fuel from entering the solid oxide fuel cell system. A thermal sensor is mounted to an external surface of one of the plurality of outer enclosure walls. The thermal sensor is operable to communicate a temperature signal to the electronic controller. The electronic controller is operable to close the fuel supply valve when the thermal sensor indicates its temperature equals or exceeds a controller fail safe temperature. Thus the only temperature sensor used to detect the controller fail safe temperature is mounted on an exterior surface of the outer enclosure.

The solid oxide fuel cell (SOFC) system includes a thermal fuse (7860) mounted to an external surface of one of the plurality of outer enclosure walls. The thermal fuse (7860) includes a fusible link configured to melt when the temperature of the fusible link equals or exceeds a system fail safe temperature. The fusible link is electrically connected between a power line disposed between a power source and the fuel supply valve. When the fusible link melts it causes a short circuit across the power line, thereby preventing power from reaching the fuel supply valve. Since the fuel supply valve is designed to close unless a power signal is available to open it, the fuel supply valve closes when the fusible link melts.

The solid oxide fuel cell (SOFC) system includes a fuel reformer module disposed within the cylindrical cavity surrounded by the annular wall that forms the forth thermally conductive pathway. The fuel reformer module includes a catalyzing body formed with catalyst fuel passages extending longitudinally through the catalyzing body. Each catalyst fuel passage is coated with a catalyst layer such that fuel passing through the catalyst fuel passages is reformed by an exothermic reaction. The fuel reformer includes a fuel reactor body that includes a perimeter wall surrounding a fuel chamber and a reactor shield base wall attached to the perimeter wall. The reactor shield base wall includes a plurality of base wall fuel passages that extend from the fuel chamber through the base wall. Each base wall fuel passage is longitudinally aligned with one of the plurality of catalyst fuel passages such that fuel exits the fuel chamber through the plurality of base wall fuel passages before passing through the plurality of catalyst fuel passages. The reactor shield body is formed from a material having a coefficient of thermal conductivity of 100 W/m° K or greater, preferably 140 to 200 W/m° K, and the perimeter wall is thermally conductively coupled to a top end flange of the outer enclosure walls.

A method of constructing a solid oxide fuel cell (SOFC) system includes enclosing an SOFC stack operating in a hot zone cavity with a plurality of hot zone enclosure walls. The hot zone enclosure walls are formed as a first thermally conductive pathway. The hot zone enclosure walls are enclosed by a plurality of outer enclosure walls. The outer enclosure walls are formed as a third thermally conductive pathway. A thermal insulation layer is disposed between the plurality of hot zone enclosure walls and the plurality of outer enclosure walls. An annular enclosure wall (3060) formed to enclose a cylindrical cavity is formed as a fourth thermally conductive pathway. The annular enclosure wall is joined together with and thermally conductively coupled to each of the first thermally conductive pathway and the third conductive pathway. Each of the first thermally conductive pathway and the third thermally conductive pathway is formed by enclosure walls made of material having a coefficient of thermal conductivity of 100 W/m° K or greater and preferably 140-200 W/m° K. The annular enclosure wall (3060) is made from a material having a coefficient of thermal conductivity of 50 W/(m° K) or less and preferably 25 W/(m° K) or less.

The method includes positioning a fuel reformer inside the cylindrical cavity formed as the fourth thermally conductive pathway. The fuel reformer includes a catalyzing body including catalyst fuel passages such that fuel passing through the catalyst fuel passages is reformed by an exothermic reaction. The fuel reformer module includes a fuel reactor body that includes a perimeter wall surrounding a fuel chamber and a reactor shield base wall attached to the perimeter wall. The perimeter wall is joined with and thermally conductively coupled with the outer enclosure formed as the third thermally conductive pathway. The reactor shield base wall includes a plurality of base wall fuel passages each longitudinally aligned with one of the plurality of catalyst fuel passages. A bottom wall of the reactor shield base wall is in proximate contact with the catalyzing body. The method includes forming the fuel reactor body from a material having a coefficient of thermal conductivity of 100 W/m° K or greater and preferably 140 W/m° K and thermally conductively coupling the perimeter wall of the fuel reactor body to one of plurality of outer enclosure walls formed as the third thermally conductive pathway.

The method includes providing a thermal sensor mounted to an external surface of one of the plurality of outer enclosure walls. The thermal sensor is provided for monitoring an instantaneous temperature of the outer enclosure walls and if the instantaneous temperature of the outside wall equals or exceeds a controller fail safe temperature the method includes operating the electronic controller to prevent fuel from entering the SOFC system by closing the fuel supply valve.

The method includes providing a thermal fuse mounted to an external surface of one of the plurality of outer enclosure walls. The thermal fuse includes a fusible link configured to melt when the instantaneous temperature of the fusible link equals or exceeds a system fail safe temperature preventing fuel from entering the SOFC system when the thermal fuse melts. The method includes making the system fail safe temperature greater than the controller fail safe temperature.

5. BRIEF DESCRIPTION OF THE DRAWINGS

The features of the present invention will best be understood from a detailed description of the invention and example embodiments thereof selected for the purposes of illustration and shown in the accompanying drawings in which.

6. DEFINITIONS

Figure 1:
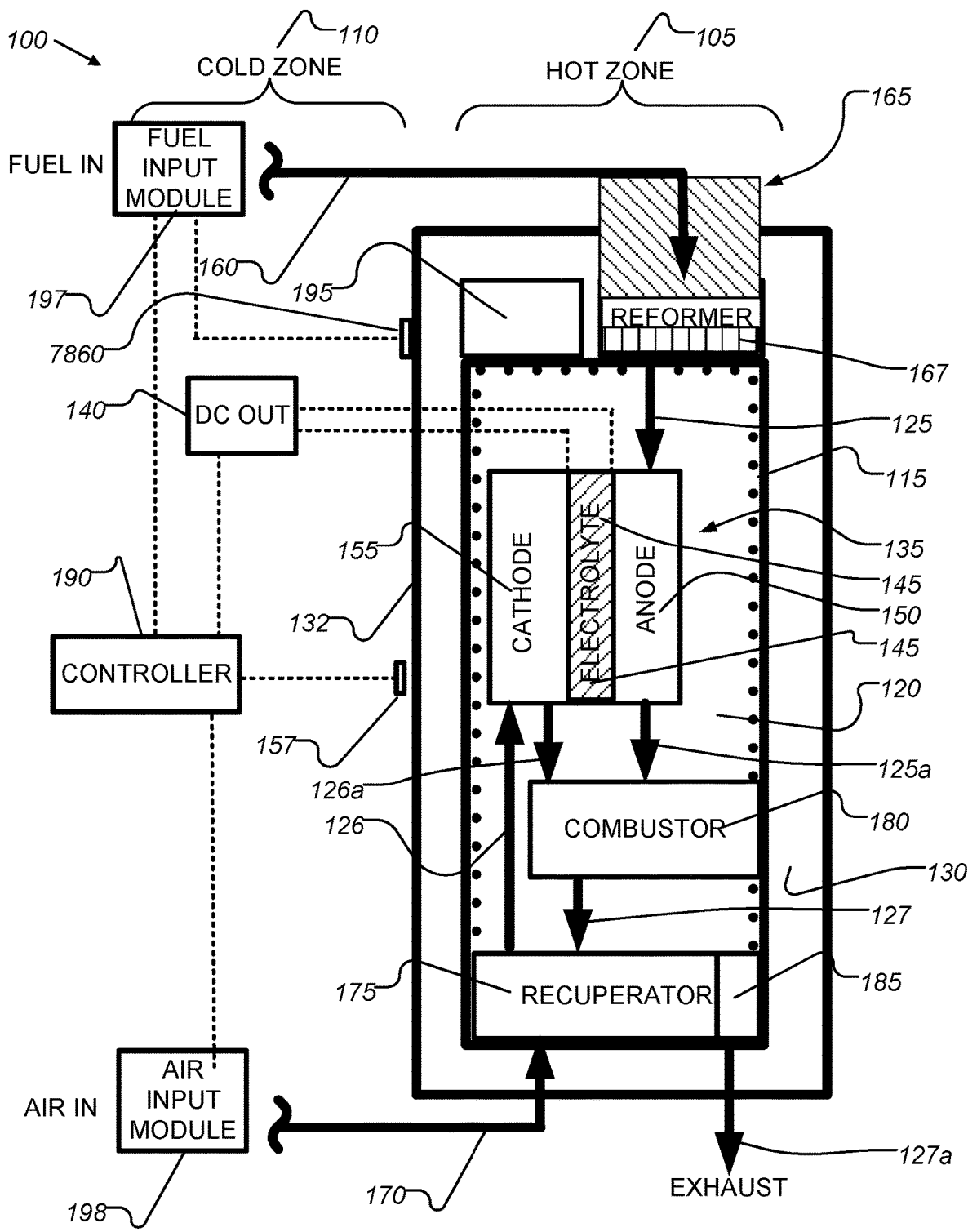
FIG. 1 depicts a schematic view of a non-limiting exemplary SOFC system embodiment according to the present invention.

The following definitions are used throughout, unless specifically indicated otherwise:

| TERM | DEFINITION |
| --- | --- |
| Hastelloy | A group of alloys comprising predominantly metal nickel plus molybdenum, chromium, cobalt, iron, copper, manganese titanium, zirconium, aluminum, and tungsten in varying percentages, between zero and 20%. Hastelloy alloys are primarily used for effective survival under high temperature and or high stress in moderate to severely corrosive environments. Available from Haynes International Inc. of Kokomo IN, USA. |
| Monel | A group of alloys comprising up to 67% metal nickel and cobalt, up to 30% copper with between 0 and 5% iron, titanium, manganese, carbon, and silicon and aluminum. Monel is used for its resistance to corrosion. Available from Special Metals Corp. of New Hartford NY, USA. |
| SOFC | Solid Oxide Fuel Cell |
| Inconel | A family of austenitic nickel-chromium alloys comprising nickel 40-70%, chromium 14-30%, iron 3-9%, manganese 0.3-1%, plus silicon, carbon, sulfur, and other elements. Inconel is used for its resistance to oxidation and corrosion and strength over a wide range of temperatures. When heated, Inconel forms a thick stable passivating oxide layer protecting the surface from further attack. Attractive for high temperature applications to reduce creep. Available from Special Metals Corp. of New Hartford NY, USA. |
| Cermet | Any of a class of heat-resistant materials made of ceramic and sintered metal. Often formed and sintered as a ceramic oxide mixture and converted through the reduction from an oxide ceramic to the metallic phase. (NiO—YSZ →Ni—YSZ). |
| Perovskite | A ternary material with the general structure $A^{[12]}B^{[6]}X_3^{[6]}$ same type of crystal structure as calcium titanium oxide ($CaTiO_3$). |

7. ITEM NUMBER LIST

The following item numbers are used throughout, unless specifically indicated otherwise.

| ITEM NUMBER | DESCRIPTION |
| --- | --- |
| 100 | SOFC system |
| 105 | Hot zone |
| 110 | Cold zone |
| 115 | Hot zone enclosure walls |
| 120 | Hot zone cavity |
| 125 | Anode gas |
| 125a | Spent anode gas |
| 126 | Cathode gas |
| 126a | Spent cathode gas |
| 127 | Combustion exhaust gases |
| 127a | Spent exhaust gas |
| 130 | Thermal insulation |
| 132 | Outer enclosure walls |
| 135 | Fuel cell stack |
| 140 | DC power output module |
| 145 | Solid electrolyte layer |
| 150 | Solid oxide anode electrode |
| 155 | Solid oxide cathode electrode |
| 157 | Hot zone thermocouple/temperature sensor |
| 160 | Incoming fuel |
| 165 | Fuel reformer module |
| 167 | Catalyst support structure |
| 170 | Incoming air |
| 175 | Recuperator module |
| 180 | Combustor module |
| 185 | Exhaust port |
| 190 | Electronic controller |
| 195 | Cold start module |
| 197 | Fuel input module |
| 198 | Air input module |
| 2000 | SOFC fuel cell stack assembly |
| 2005 | SOFC fuel cell stack |
| 2010 | Cathode chamber |
| 2015 | Longitudinal cylindrical side wall |
| 2016 | Disk shaped bottom end wall |
| 2017 | Disk shaped top end wall |
| 2020 | Fuel reformer module |
| 2025 | Incoming fuel air mixture |
| 2026 | Spent cathode gas |
| 2027 | Reformed fuel/syngas |
| 2028 | Spent fuel |
| 2045 | Fuel input conduit |
| 2055 | Fuel inlet manifold |
| 2060 | Longitudinal axis |
| 2080 | Tubular fuel cells |
| 2082 | Disk shaped top tube support wall |
| 2084 | Disk shaped bottom tube support wall |
| 2086 | Tube holding flange |
| 2115 | Anode gas flow |
| 2135 | Combustion chamber |
| 2145 | Cathode feed tube |
| 2150 | Combustor exit port |
| 2155 | Air gap |
| 2165 | System exit port |
| 2200 | Incoming air |
| 2205 | Air input port |
| 2210 | Recuperator chamber |
| 2212 | Flow barrier |
| 2214 | Disk shaped separator wall |
| 2230 | Recuperator input ports |
| 2235 | Recuperator output port |
| 2240 | Air exit ports |
| 2245 | Cathode chamber exit port |
| 2300 | Cold start combustion chamber |
| 2302 | Cold start exit port |
| 2304 | Fuel inlet |
| 2306 | Ignitor |
| 2510 | Intermediate cylindrical sidewall |
| 2511 | Disk shaped intermediate bottom end wall |
| 2512 | Thermal insulation |
| 2513 | Disk shaped intermediate top end wall |
| 2514 | Outer cylindrical sidewall |
| 2516 | Disk shaped outer top wall |
| 2518 | Disk shaped outer bottom wall |
| 2830 | Fuel supply valve power conduit |
| 3000 | Fuel reformer system |
| 3005 | Cylindrical fuel chamber |
| 3010 | Annular perimeter wall |
| 3015 | Reactor shield base wall |
| 3017 | Fuel chamber cap |
| 3020 | Fuel reformer module |
| 3025 | Incoming fuel air mixture |
| 3030 | Cylindrical catalyzing body |
| 3032/3033 | Catalyzing body input end |
| 3034 | Catalyzing body output end |
| 3035 | Cylindrical catalyzing cavity |
| 3040 | Fuel reactor body |
| 3055 | Fuel inlet manifold |
| 3060 | Annular enclosure wall |
| 3065 | Catalyzing body support flange |
| 3070 | Circular aperture |
| 3075 | First annular washer |
| 3080 | Annular thermally insulting element |
| 3085 | Catalyst fuel passage |
| 3088 | Catalyst fuel passage (larger square) |
| 3090 | Catalyst layer |
| 3095 | Base wall fuel passages |
| 3100 | Heat dissipating flange |
| 3102 | Disk shaped outer enclosure top end flange |
| 3105 | Annular seal plate |
| 3110 | O-ring seal element |
| 3115 | O-ring seal element |

-continued

| ITEM NUMBER | DESCRIPTION |
| --- | --- |
| 3120 | Fasteners |
| 3125 | Array of fuel passages |
| 3130 | Air moving element |
| 3135 | Temperature sensing element |
| 3140 | Communication pathway |
| 5000 | SOFC system |
| 5002 | Cathode chamber |
| 5010 | Circumferential edge |
| 5015 | Inner shaded area |
| 5020 | Outer shaded area |
| 5025 | Cathode feed tube |
| 5030 | Longitudinal central axis |
| 5035 | Inner circular pattern |
| 5040 | Tubular fuel cell |
| 5045 | Outer circular pattern |
| 7000 | Fuel Reformer System |
| 7005 | Fuel chamber |
| 7010 | Annular perimeter wall |
| 7015 | Reactor shield base wall |
| 7020 | Fuel reformer module |
| 7035 | Cylindrical catalyzing cavity |
| 7040 | Fuel reactor body |
| 7045 | Fuel conduit |
| 7060 | Annular enclosure wall |
| 7102 | Outer enclosure top end flange |
| 7105 | Annular seal plate |
| 7110 | O-ring seal element |
| 7135 | External temperature sensor |
| 7140 | Communication pathway |
| 7610 | Fuel supply valve |
| 7666 | Fuel supply valve communication channel |
| 7830 | Power conduit |
| 7860 | Thermal fuse |

8. DETAILED DESCRIPTION OF THE INVENTION

8.1 Solid Oxide Fuel Cell System

Referring to FIG. 1, a schematic diagram of a first exemplary non-limiting embodiment of the present invention depicts a Solid Oxide Fuel Cell (SOFC) system (100). The system (100) includes a hot zone (105) enclosed within hot zone enclosure walls (115) which in the present embodiment enclose a cylindrical hot zone cavity (120). The hot zone enclosure walls (115) are further enclosed by a layer of thermal insulation (130) which is further enclosed by outer enclosure walls (132). The hot zone enclosure walls (115) and the outer enclosure walls (132) each include a separate cylindrical side wall with each sidewall mechanically interfaced with a different pair of opposing disk shaped end walls described further below.

The hot zone enclosure walls (115) enclose a fuel cell stack (135). The fuel cell stack (135) includes at least one SOFC fuel cell but preferably includes a plurality of SOFC fuel cells each electrically interconnected in series or in parallel with a DC power output module (140). The DC power output module receives electrical power generated by the fuel cell stack and delivers output power to an external power load, (not shown). Each fuel cell comprises a solid oxide cathode electrode (155) which is oriented for exposure to cathode gas present inside the hot zone cavity (120). The hot zone cavity (120) is filled with a cathode gas that at least comprises oxygen, e.g. air, (126) during operation and the cathode gas in the hot zone cavity (120) chemically reacts with surfaces of the solid oxide cathode electrode (155). Each fuel cell further comprises a solid oxide anode electrode (150) which is not exposed to the hot zone cavity (120) or to the cathode gas contained therein but instead is oriented for exposure to an anode gas (reformed fuel) (125) such that during operation the anode gas is passed over the solid oxide anode electrode (150) in order to chemically react with the solid oxide anode electrode (150). The SOFC fuel cell further comprises a solid electrolyte layer (145) disposed to separate the solid oxide cathode electrode (155) from the solid oxide anode electrode (150). The solid electrolyte layer (145) is an oxygen ion conducting layer provided as an ion exchange medium for ion exchange between the solid oxide anode electrode (150) and the solid oxide cathode electrode (155).

The fuel cell stack (135) is maintained at a high operating temperature (e.g. ranging from 350 to 1200° C.), depending on the composition of the solid material layers of the fuel cell stack and the characteristics of the anode and cathode gases. A preferred operating temperature is selected to support efficient electrochemical energy generation. Electrical energy is generated by the fuel cell stack (135) when anode gas (125) comprising hydrogen is reacted with the solid oxide anode electrode (150) and cathode gas (126) comprising oxygen is reacted with the solid oxide cathode electrode (155).

The hot zone (105) further encloses a combustor module (180), or tail-gas combustor, which comprises a combustion chamber configured to receive spent anode gas (125a) and spent cathode gas (126a) after each of the spent anode gas and the spent cathode gas has reacted with the corresponding solid oxide anode electrode (150) and solid oxide cathode electrode (155). Upon mixing in the combustor module (180) the spent anode gas (125a) and the spent cathode gas (126a) are combusted. Thermal energy generated by combustion taking place inside the combustion module (180) is used to heat the hot zone enclosure walls (115) as well as the hot zone cavity (120).

The hot zone cavity (120) further encloses a recuperator module (175). The recuperator module (175) is in fluid communication with the combustor module (180) and receives combustion exhaust gases (127) exiting therefrom. The combustion exhaust gases (127) pass through the recuperator module (175) and transfer thermal energy therefrom to incoming air (170) when each of the combustion exhaust gases (127) and the incoming air (170) pass through separate gas conduits of a gas counter flow heat exchanger (not shown). Thereafter, spent combustion exhaust gas (127a) exits the recuperator module (175) and is delivered out of the hot zone through an exhaust port (185). The incoming air (170) after exiting from the recuperator module (175) comprises the cathode gas (126) which is delivered into the hot zone cavity (120).

The system cold zone (110) includes a fuel input module (197). Various hydrocarbon fuels such as propane, methane, or kerosene, and other suitable fuels, are received into the fuel input module (197) from various fuel sources (not shown). The fuel input module (197) is operable to modulate incoming fuel (160) delivered from the fuel source and deliver a desired volume or mass flow rate of incoming fuel (160) to the fuel reformer module (165). The fuel reformer (165) is operable to reform the fuel in a manner that makes the incoming fuel more suitable for the desired chemical reaction with the solid oxide anode electrode (150).

The incoming fuel (160) comprises a liquid or gaseous hydrocarbon compound from which hydrogen can be extracted. The incoming fuel (160) may be mixed with air and may be atomized or otherwise vaporized. The fuel reformer module (165) of the present invention comprises a Catalytic Partial Oxidation (CPDX) reactor which provides a catalyst support structure (167) having some of its surfaces coated by a catalytic layer, described below. As the incoming fuel is passed over the catalyst layer, the fuel is combusted or partially combusted inside the catalyst support structure (167). The heat generated by the combustion reforms the incoming fuel (160) into hydrogen gas ($H_2$) and carbon monoxide gas (CO). The reformed fuel exits the fuel reformer module (165) as anode gas (125) which is reacted with the solid oxide anode electrode (150) of each fuel cell in the SOFC fuel cell stack (135).

The system cold zone (110) includes an air input module (198) for incoming air (170) or another oxygen rich source gas into the recuperator module (175). Air or any other oxygen rich source gas is received into the air input module (198) from various air sources, (not shown), or the air comprises room air which is pumped into the recuperator module (175) by a fan. The air input module (198) is operable to modulate air flow into the recuperator module (175). The recuperator module (175) heats the incoming air (170) with combustion exhaust gases (127) by passing the combustion exhaust gases through a gas counter flow heat exchanger (not shown). The heated air exits the recuperator as the cathode gas (126).

The system cold zone (110) includes an electronic controller (190) in electrical communication with the fuel input module (197) and the air input module (198). The electronic controller (190) includes a digital data processor and associated digital data memory with various operating programs and or digital logic control elements operating thereon to manage operation of the SOFC system (100). The electronic controller (190) is in electrical communication with the DC power output module (140) to monitor and modulate DC power output to a load. The electronic controller is also in electronic communication with the fuel input module (197) to monitor and modulate incoming fuel (160) and further is in electronic communication with the air input module (198) to monitor and modulate incoming air (170) and further is in electronic communication with the at least one temperature sensor (157) to monitor the temperature of one or more surfaces of the hot zone enclosure walls (115), the outer enclosure walls (132), the fuel reformer module (165) and other surfaces as may be required to monitor temperature of various surfaces of the SOFC system (100).

Each of the fuel input module (197) and the air input module (198) may include one or more gas pressure regulators, gas flow actuator valves, mass or volume gas flow rate controllers, and or mass flow rate sensors, or the like, gas pressure sensors, or the like, and temperature sensors, or the like, each operable by or otherwise in electrical communication with the electronic controller (190) to modulate incoming fuel (160) into the fuel reformer module (165) or incoming air (170) into the recuperator module (175). More specifically the fuel input module (197) in cooperation with the electronic controller (190) is operable to regulate input fuel pressure, to variably regulate incoming fuel mass or volume flow rates and to stop incoming fuel (160) from entering the SOFC system (100) as required. Similarly, the air input module (198) in cooperation with the electronic controller (190) may also be operable to regulate input air pressure, to variably regulate incoming air mass or volume flow rates and to stop incoming air (170) from entering the SOFC system (100) as required. In some operating environments the air input module (198) may comprise a simple fan running at constant angular velocity without any further air input control sensors or elements.

According to the present invention the fuel reformer module (165) is configured to cause an exothermic reaction between the incoming fuel (160) and catalyst layers provided on surfaces of the ceramic catalyst support structure (167) in order to reform the fuel into hydrogen gas ($H_2$) and carbon monoxide (CO). Further, according to the present invention an improved fuel reformer module (165) comprises a ceramic catalyst support structure (167) comprising a plurality of longitudinal fuel flow passages, described below, with each longitudinal fuel flow passage being coated on internal surfaces thereof with a catalyst layer. In addition, the fuel reformer module (165) is configured to prevent auto ignition of unprocessed fuels entering the ceramic catalyst support structure (167) in part by providing the longitudinal fuel flow passage as a means of transferring thermal energy generated by the exothermic reaction taking place inside the ceramic catalyst support structure (167) out of the ceramic catalyst support structure (167) along the longitudinal pathways toward the incoming fuel. As can be seen in FIG. 1, the fuel reformer module (165) is disposed in part between the outer enclosure walls (132) and in part outside the outer enclosure walls (132) and is further configured to provide a thermally conductive pathway that passes through the outer enclosure walls (132). In addition the SOFC system (100) optionally includes one or more cooling devices (e.g. air fans, water pumps, or the like) to cool portions of the fuel reformer module (165) that are disposed outside the outer enclosure walls (132).

The SOFC system (100) may optionally include a cold start module (195). The cold start module (195) is configured to receive and combust a portion of the incoming fuel (160) which is redirected into the cold start module (195). Operation of the cold start module (195) is initiated by the electronic controller (190) when the temperature of the incoming fuel (160) or the temperature of the hot zone enclosure walls (115) or the temperature of the fuel cell stack (135) is below a desired operating or reaction temperature. In operation, a portion of the incoming fuel (160) is diverted to a combustion chamber associated with the cold start module (195). A controllable fuel igniter is provided inside a combustion chamber of the cold start module (195) and fuel inside the combustion chamber is ignited and combusted to heat the incoming fuel (160), the fuel reformer module (165) and the hot zone enclosure walls (115) during a cold start. Once the SOFC system (100) reaches its desired operating temperature, operation of the cold start module (195) is terminated.

During operation, the electronic controller (190) is in communication with other electronic elements such as one or more cooling fans, one or more electrically operable gas flow actuator valves, gas flow rate detectors, and or gas modulators, associated with the fuel input module (197), the air input module (198) and electrical power output detectors, or the like, and other elements as may be required to control various operating parameters of the SOFC (100). The electronic controller (190) monitors DC current/power output as well as temperature measured by one or more thermocouples, or the like, and further operates to vary the mass flow rate of incoming fuel and optionally of incoming air as a means of increasing or decreasing DC current/power output.

8.2 Solid Oxide Fuel Cell Stack Side Section

Figure 2:
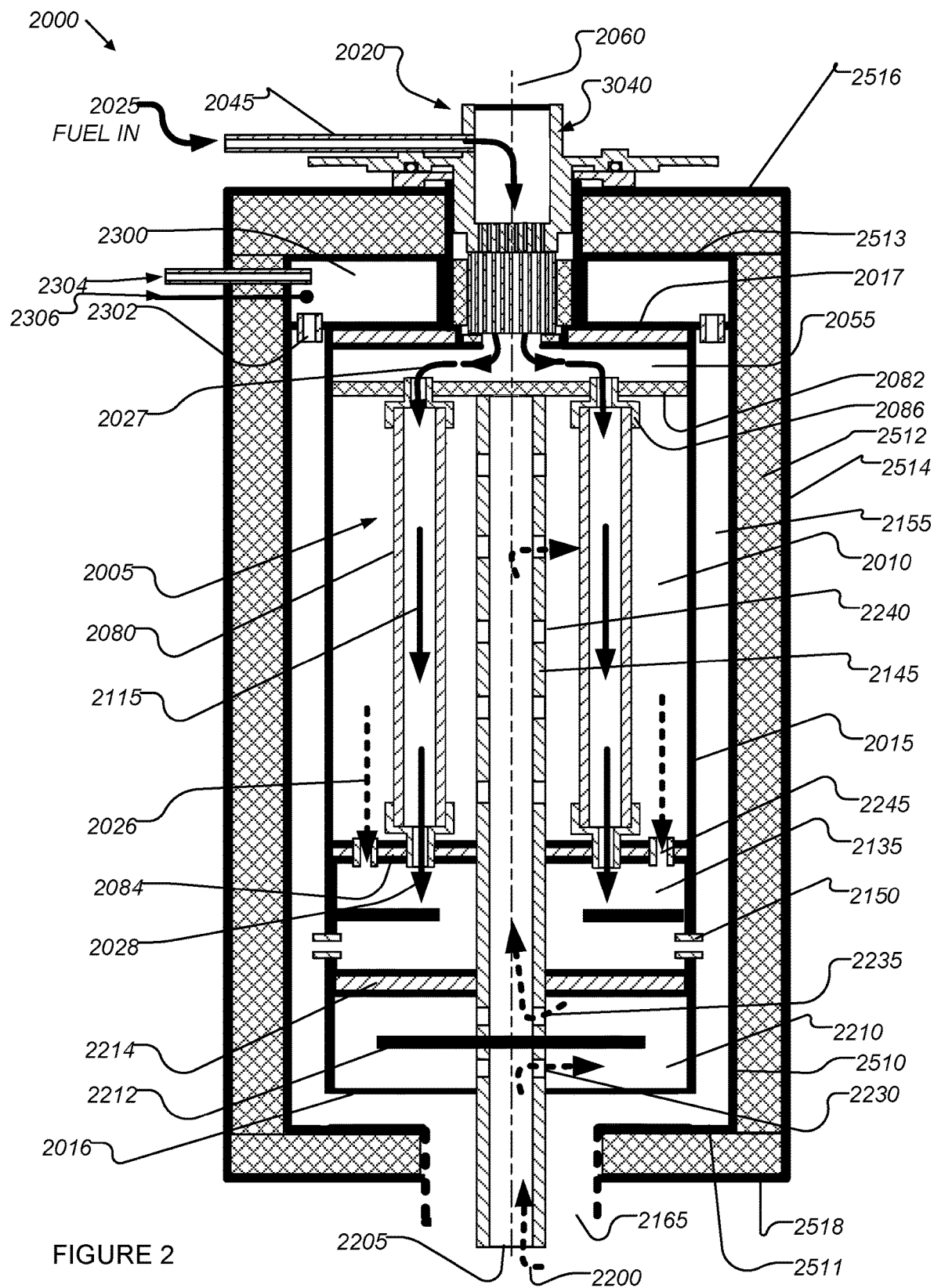
FIG. 2 depicts a schematic side section view taken through a non-limiting exemplary solid oxide fuel cell stack assembly according to the present invention.

Turning now to FIG. 2, a second non-limiting exemplary embodiment of an improved SOFC fuel cell stack assembly (2000) according to the present invention is shown in side section view. In particular the SOFC fuel cell stack assembly (2000) includes a SOFC fuel cell stack (2005) comprising a plurality of tubular fuel cells (2080) each longitudinally extended along a substantially cylindrical hot zone cavity or cathode chamber (2010).

The cylindrical cathode chamber (2010) is bounded by cylindrical hot zone enclosure walls which include an open ended longitudinal cylindrical side wall (2015) that is mechanically interfaced with a disk shaped bottom end wall (2016) and with an opposing disk shaped top end wall (2017). The cylindrical cathode chamber (2010) or hot zone cavity is formed as a gas tight chamber and each wall thereof comprises materials having a high coefficient of thermal conductivity, e.g. between 100 and 300 W/(m° K), and preferably above 200 W/(m° K). Accordingly, the longitudinal cylindrical side wall (2015), disk shaped bottom end wall (2016) and disk shaped top end wall (2017) are fabricated from one or more of copper, molybdenum, aluminum copper, copper nickel alloys, or a combination thereof, and each wall is preferably nickel coated on surfaces that face the cathode chamber (2010) or on any surfaces that may be exposed to an oxygen rich environment. The nickel coating is provided in order to prevent surface oxidation due to contact with oxygen rich gases. Specifically each of the hot zone enclosure walls (2015, 2016, 2017) is configured to provide a first thermally conductive pathway for rapid conduction of thermal energy by thermal conduction from one area of the hot zone walls to another in order to more rapidly reduce temperature gradients and maintain the entire hot zone enclosure wall structure substantially at the same temperature. Additionally disk shaped bottom end wall (2016) and disk shaped top end wall (2017) are each preferably formed with a copper core having sufficient thermal mass to rapidly absorb thermal energy from the cold start combustion chamber (2300) and the combustion chamber (2135) and to rapidly distribute the absorbed thermal energy to the side wall (2015) by thermal conduction. In various embodiments each hot zone enclosure wall (2015, 2016 and 2017) is formed with a wall thickness ranging from about 0.5 mm, (0.020 inch) to about 6.5 mm (0.25 inch); however thickness may vary from this range in different applications and SOFC unit sizes. Moreover some regions of the hot zone enclosure walls may be formed with a thicker wall thickness than other parts of the hot zone enclosure and may comprise a combination of thermally connective materials each having different coefficient of thermal conductivity. In particular one part of the hot zone enclosure walls is formed with a different thermal mass than another part of the hot zone enclosure walls as required to absorb thermal energy more rapidly from a local region, (example: proximate to a combustion area or the like). Thus according to one aspect of the present invention the hot zone enclosure walls (2015, 2016, and 2017) are formed as a first thermally conductive pathway.

In the present example embodiment, the disk shaped bottom end wall (2016) also forms a bottom wall of a recuperator chamber (2210). As described above the recuperator chamber (2210) is provided to heat incoming air (2200) entering the fuel cell stack assembly through a cathode feed tube (2145). The incoming air (2200), or cathode gas, flows into the recuperator chamber (2210) through recuperator input ports (2230) and out of the recuperator chamber (2010) returning back to the cathode feed tube (2145) through recuperator output ports (2235). One or a plurality the recuperator input ports (2230) and the recuperator output port (2235) may be disposed around the circumference of the cathode feed tube (2145). A flow barrier (2212) directs air flow toward peripheral walls of the recuperator chamber (2210) thereby increasing thermal energy exchange between air passing through the recuperator chamber and its peripheral walls. The recuperator chamber (2210) is bounded on a top side thereof by a disk shaped separator wall (2214) disposed between a combustion chamber (2135) and the recuperator chamber (2210). The disk shaped separator wall (2214) is configured to absorb thermal energy as spent anode and spent cathode gas is combusted inside the combustion chamber (2135) such that the absorbed thermal energy is reemitted into the recuperator chamber (2210).

An intermediate cylindrical enclosure surrounds the hot zone enclosure walls. The intermediate cylindrical enclosure is bounded by an open ended longitudinal intermediate cylindrical side wall (2510) that mechanically interfaces with a disk shaped intermediate bottom end wall (2511) and an opposing disk shaped intermediate top end wall (2513). The intermediate cylindrical enclosure is sized to form an air gap (2155) substantially surrounding the longitudinal cylindrical side wall (2015) and the disk shaped top end wall (2017). The air gap (2155) provides a fluid flow passage proximate to portions of the hot zone enclosure walls and the fluid passage is in fluid communication with a system exit port (2165). The air gap (2155) is further in fluid communication with the combustion chamber (2135) through one or more combustor exit ports (2150) and is in fluid communication with a cold start combustion chamber (2300) through one or more cold start exit ports (2302). Accordingly exhaust gas exiting each the combustion chamber (2135) and the cold start combustion chamber (2300) flows over outside surfaces of the hot zone enclosure walls before exiting the fuel cell stack assembly (2000) through the system exit port (2165). In one non-limiting example embodiment the dimension of the air gap (2155) from an exterior surface of wall (2015) to an interior surface of wall (2510) ranges from 1 to 4 mm. The intermediate cylindrical enclosure also encloses a cold start combustion chamber (2300) further described below.

Each of the intermediate enclosure walls (2510, 2511, and 2513) comprise Hastelloy, a Cobalt-Nickel-Chromium-Tungsten alloy that combines excellent high temperature strength with very good resistance to oxidizing environments up to 2000° F. (1095° C.). Other metal alloys are also suitable including Monel, which is a group of alloys comprising up to 67% metal nickel and about 30% copper with smaller amounts of iron, manganese, carbon, and silicon. In any event the intermediate enclosure walls (2510, 2511, and 2513) are preferably formed from a metal alloy that has a coefficient of thermal conductivity of less than about 25.0 W/(m° K) at the operating temperature of the hot zone. This much lower coefficient of thermal conductivity of the intermediate enclosure walls as compared with the thermal conductivity of the hot zone enclosure walls causes a much slower conductive heat flow rate from one area of the intermediate enclosure walls to another as compared with the heat flow rate of the hot zone enclosure walls which are formed from a metal alloy having much higher, e.g. at least 4× greater, coefficient of thermal conductivity. Thus according to one aspect of the present invention the intermediate enclosure walls (2510, 2511, and 2513) are formed as a second thermally conductive pathway having a slower rate of thermally conducted heat transfer. One other embodiments the intermediate enclose walls (2510, 2511, and 2513) may comprise steel or other metal alloys that may have a coefficient of thermal conductivity of less than about 50.0 W/(m° K) without deviating from the present invention.

An outer cylindrical enclosure surrounds the intermediate cylindrical enclosure. The outer enclosure is bounded by an open ended outer cylindrical side wall (2514) that mechanically interfaces with a disk shaped outer bottom wall (2518) and an opposing disk shaped outer top wall (2516). Each of the walls (2514, 2518, and 2516) preferably comprises aluminum or an aluminum alloy preferably having a coefficient of thermal conductivity above 140 W/m° K to support rapid thermal energy conduction in order to provide a substantially homogeneous temperature of the outer cylindrical enclosure during operation. A layer of thermal insulation (2512) is disposed between outside surfaces of the intermediate enclosure walls and the inside surfaces of outer enclosure walls and the layer of thermal insulation (2512) impedes thermal energy being radiated across the air gap (2155) or being carried through the air gap by exhaust gases exiting the SOFC system from reaching surfaces of the outer cylindrical side wall (2514) and the disk shaped outer bottom wall (2518). Preferably, the layer of thermal insulation (2512) is constructed to ensure that surfaces of the outer cylindrical side wall (2514) and the disk shaped outer bottom wall (2518) remain within operational parameters, e.g. the layer of thermal insulation (2512) is configured to prevent the temperature of the outer cylindrical side wall (2514) and the disk shaped outer bottom wall (2518) from reaching more than about 110° C. Thus according to one aspect of the present invention the outer enclosure walls (2514, 2518, and 2516) are formed as a third thermally conductive pathway.

A plurality of tubular fuel cells (2080) also known as fuel rods or rods are longitudinally supported inside the cathode chamber (2010) between disk shaped top tube support wall (2082) and opposing disk shaped bottom tube support wall (2084). Each tubular fuel cell (2080) comprises a solid oxide anode electrode support structure that forms the inside diameter of the tube. A solid ceramic electrolyte layer is formed over the outside diameter of the solid oxide anode electrode support layer and a solid oxide cathode electrode layer is formed over the outside diameter of the solid electrolyte layer. Each tubular fuel cell (2080) is open at both ends thereof and provides a cylindrical fluid conduit for anode gas, also referred to herein as reformed fuel or syngas, to flow through. A plurality of tube holding flanges (2086) are optionally provided to support tube ends with respect to the top tube support walls (2082) and the bottom tubular support wall (2084). Each tube holding flange (2086) also includes an electrically conductive terminal electrically interfaced to the DC power output module (140).

The solid anode electrode used to form the support layer of each tubular fuel cell (2080) may comprise a cermet material such as nickel and doped zirconia, nickel and doped ceria, or copper and ceria. Alternately the solid anode electrode may comprise a perovskite such as Sr2Mg1−xMnxMoO6-δ or La 0.75Sr0.25Cr0.5Mn0.5O3-δ. In either case the inside surface of each of the tubular fuel cells (2080) comprises the solid oxide anode electrode and anode gas flow (2115) passes through each disk shaped top tube support wall (2082) such that only anode gas flow (2115) enters each of the tubular fuel cells (2080) through a fuel inlet manifold (2055) to react with the solid anode electrode.

The solid oxide cathode electrode may comprise any one of Lanthanum Strontium Cobalt Oxide (LSC), Lanthanum Strontium Cobalt Iron Oxide (LSCF), or Lanthanum Strontium Manganite (LSM). The solid oxide cathode electrode forms an outside surface of each tubular fuel cell (2080). As the cathode chamber (2010) is filled with the incoming air (2200) (i.e. cathode gas), the cathode gas reacts with the solid oxide cathode electrode formed on the outside surface of each tubular fuel cell (2080).

The electrolyte layer is disposed between the anode layer and the cathode layer. The preferred electrolyte layer comprises an ion conducting ceramic medium and preferably comprises an oxygen ion conductor such as yttria doped zirconia or gadolinium doped ceria. Alternately, the electrolyte layer is a proton conducting ceramic such as barium cerates or barium zirconates. Ideally, the electrolyte layer is formed with sufficient thickness so as to provide a near hermetic barrier between the anode electrode and the cathode electrode to prevent anode and cathode gas from crossing the electrolyte layer.

The improved SOFC fuel cell stack assembly (2000) optionally includes a cold start combustion chamber (2300). The cold start combustion chamber (2300) is housed within the intermediate chamber walls and is bounded by the intermediate longitudinal cylindrical side wall (2510), the intermediate top wall (2513) and the disk shaped top end wall (2017) of the cathode chamber. The cold start combustion chamber (2300) forms an annular chamber volume that partly surrounds the fuel reformer module (2020). When starting the SOFC system from a cold start, a portion of the incoming fuel air mixture (2025) is diverted to the cold start chamber (2300) through a fuel inlet (2304) and ignited by an igniter (2306). Thus during a cold start a portion of the incoming fuel air mixture (2025) is combusted in the cold start combustion chamber (2300). The thermal energy generated by combustion in the cold start combustion chamber (2300) is radiated into the surrounding walls thereof, which includes the disk shaped top end wall (2017), that is specifically configured with a copper core provided to rapidly absorb thermal energy. Moreover the disk shaped top end wall (2017) is part of the hot zone enclosure walls surrounding the cathode chamber (2010) which form the first thermally conductive pathway. Once absorbed by the disk shaped top end wall (2017) thermal energy is rapidly conducted through the hot zone enclosure walls which all comprise highly thermally conductive materials. Exhaust from combustion taking place inside the cold start chamber (2300) exits the chamber through exhaust ports (2302) and passes through the air gap (2155) to the system exit port (2165). During the passage through the air gap (2155) the combustion exhaust transfers thermal energy to the hot zone enclosure walls (2015) and (2016) by radiation and convection to further aid in heating the hot zone enclosure walls to a desired steady state operating temperature.

The incoming fuel air mixture (2025) enters the improved SOFC fuel cell stack assembly (2000) through a fuel reformer module (2020). In the present preferred embodiment the fuel reformer is a Catalytic Partial Oxidation (CPDX) reactor. The fuel reformer module (2020) receives the incoming fuel air mixture (2025) through the fuel input conduit (2045) and reforms the incoming fuel air mixture (2025) to provide reformed fuel or syngas (2027) which is used as the anode gas to react with the solid oxide anode electrode formed on the inside wall of each of the tubular fuel cells (2080). The reformed fuel or syngas (2027) exits from the fuel reformer module (2020) and enters a fuel inlet manifold (2055). The fuel inlet manifold (2055) is configured to distribute anode gas into a top or input end of each of the plurality of tubular fuel cells (2080). At the bottom or output end of each tubular fuel cell (2080), spent fuel (2028) comprising hydrogen depleted anode gas exits the tubular fuel cell to the combustion chamber (2135) where is it mixed with spent cathode gas (2026) or oxygen depleted air and combusted.

Incoming air (2200), or cathode gas, shown by dashed lines, enters the improved SOFC fuel cell stack assembly (2000) through the cathode feed tube (2145), passes through the recuperator chamber (2210) where it is heated by surfaces thereof and then reenters the cathode feed tube through recuperator output ports (2235). The heated air then passes through the combustion chamber (2135) while flowing through the cathode feed tube (2145) where the air is further heated by thermal energy being generated by combustion and being transferred to and through the wall of the cathode feed tube (2145) before entering the cathode chamber (2010). A plurality of air exit ports (2240) pass through the cathode feed tube (2145), inside the cathode chamber (2010) and the heated air enters the cathode chamber (2010) through the air exit ports (2240). Once inside the cathode chamber, the heated air or cathode gas reacts with the solid oxide cathode electrode formed on the outside surface of each tubular fuel cell (2080). Spent cathode gas (2026) exits the cathode chamber through cathode chamber exit ports (2245) to the combustion chamber (2135) where it is mixed with spent anode gas (2028) and combusted. Exhaust gas exits from the combustion chamber (2135) to the air gap (2155) through the combustor exit ports (2150) to heat the walls of the recuperator chamber (2210) as the exhaust gas flows toward the system exit port (2165).

8.3 Solid Oxide Fuel Cell Stack Top Section View

The schematic diagram of FIG. 2 depicts a schematic side section view of an improved SOFC fuel cell stack assembly (2000) that shows only two tubular fuel cells (2080) to simplicity the description. However a preferred stack comprises more than two tubular fuel cells (2080) with the fuel cells arranged within the cathode chamber (2005) in a manner that provides efficient use of space, promotes efficient gas flow patterns and provides the desired power output at the desired voltage.

Figure 5:
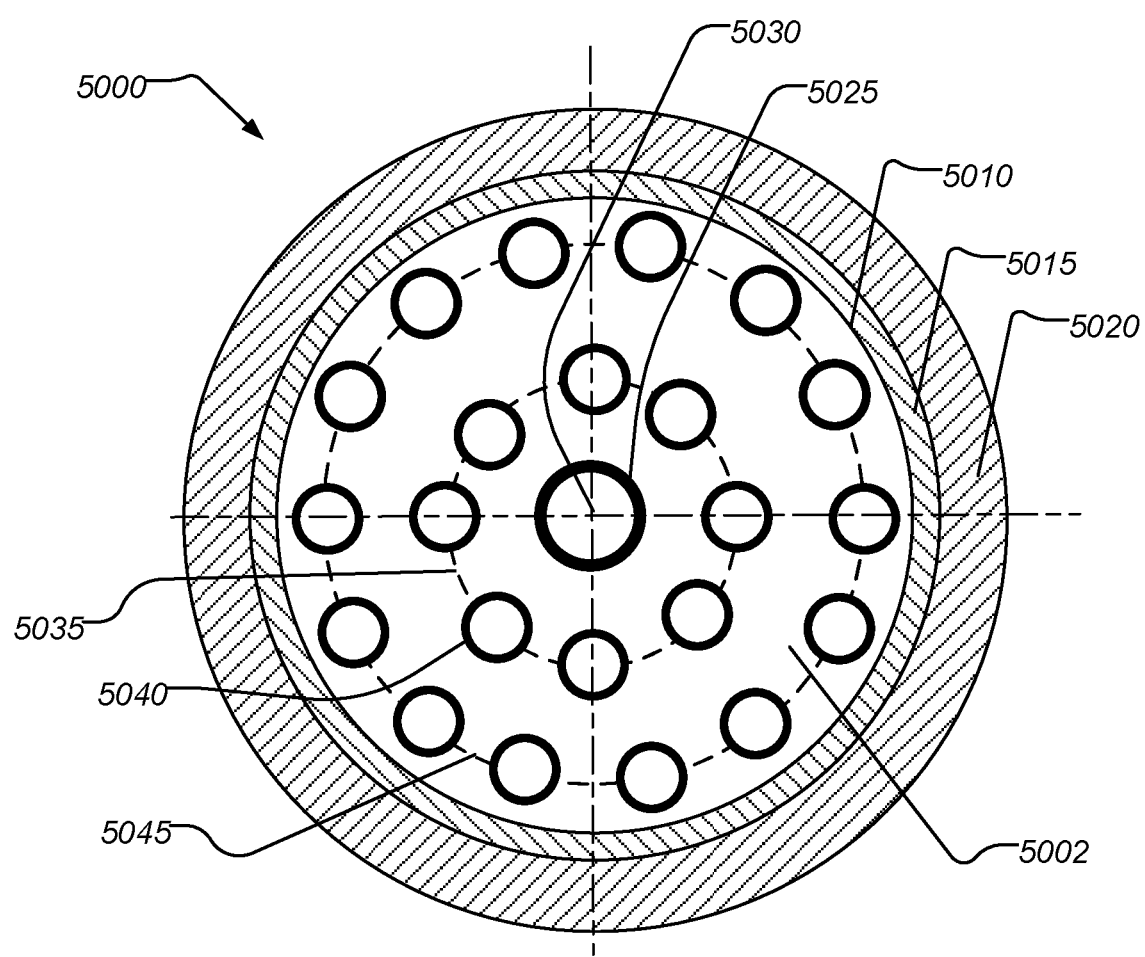
FIG. 5 depicts a schematic top section view taken through a non-limiting exemplary cathode chamber according to the invention.

Referring now to FIG. 5 the figure depicts a non-limiting exemplary schematic top section view taken through a non-limiting exemplary cathode chamber of an improved SOFC stack (5000) of one example of the present invention. The cathode chamber (5002) is bounded by an open ended longitudinal cylindrical side wall, e.g. longitudinal cylindrical side wall (2015) shown in FIG. 2 which defines a circumferential edge (5010). The inner shaded area (5015) represents the longitudinal intermediate cylindrical side wall (2510) and the air gap (2155) shown in FIG. 2. The outer shaded area (5020) represents the layer of thermal insulation (2512) and the outer cylindrical side wall (2514) shown in FIG. 2.

A cathode feed tube (5025) is positioned at the center of the cathode chamber (5002) to distribute cathode gas into the cathode chamber through a plurality of radially disposed air exit ports, e.g. (2240) shown in FIG. 2. A longitudinal central axis (5030) centers the cathode feed tube (5025) and the circumferential edge (5010).

The improved SOFC stack (5000) includes a plurality of substantially identical tubular fuel cells (5040) each comprising a solid oxide anode electrode that structurally forms the inside diameter of each tubular fuel cell (5040) and with a solid oxide cathode electrode formed on the outside diameter of each tubular fuel cell (5040). A first plurality of tubular fuels is arranged in an inner circular pattern (5035) with the center of each of the first plurality of tubular fuels at the same radial distance from the longitudinal central axis (5030) as shown by the inner circular pattern (5035). The inner circular pattern (5035) may be a symmetrical circular pattern wherein the inner tubular fuel cells are equally spaced apart around the inner circular pattern (5035) or the first plurality of tubular fuel cells may be positioned around the inner circular pattern (5035) with unequal angular distribution or angular separation.

A second plurality of tubular fuel cells is arranged in an outer circular pattern (5045) with the center of each of the second plurality of tubular fuel cells at the same radial distance from the longitudinal central axis (5030) as shown by the outer circular pattern (5045). The outer circular pattern (5045) may be a symmetrical circular pattern wherein the second plurality of fuel cells is equally spaced apart around the outer circular pattern (5045) or the second plurality of fuel cells may be positioned around the outer circular pattern (5045) with unequal angular distribution of angular separation. In the present example embodiment the total number of fuel cells is twenty two (22). Other patterns of fuel cell distribution with other total number of fuel cells are usable without deviating from the present invention.

8.4 Improved CPDX Fuel Reformer

Figure 3:
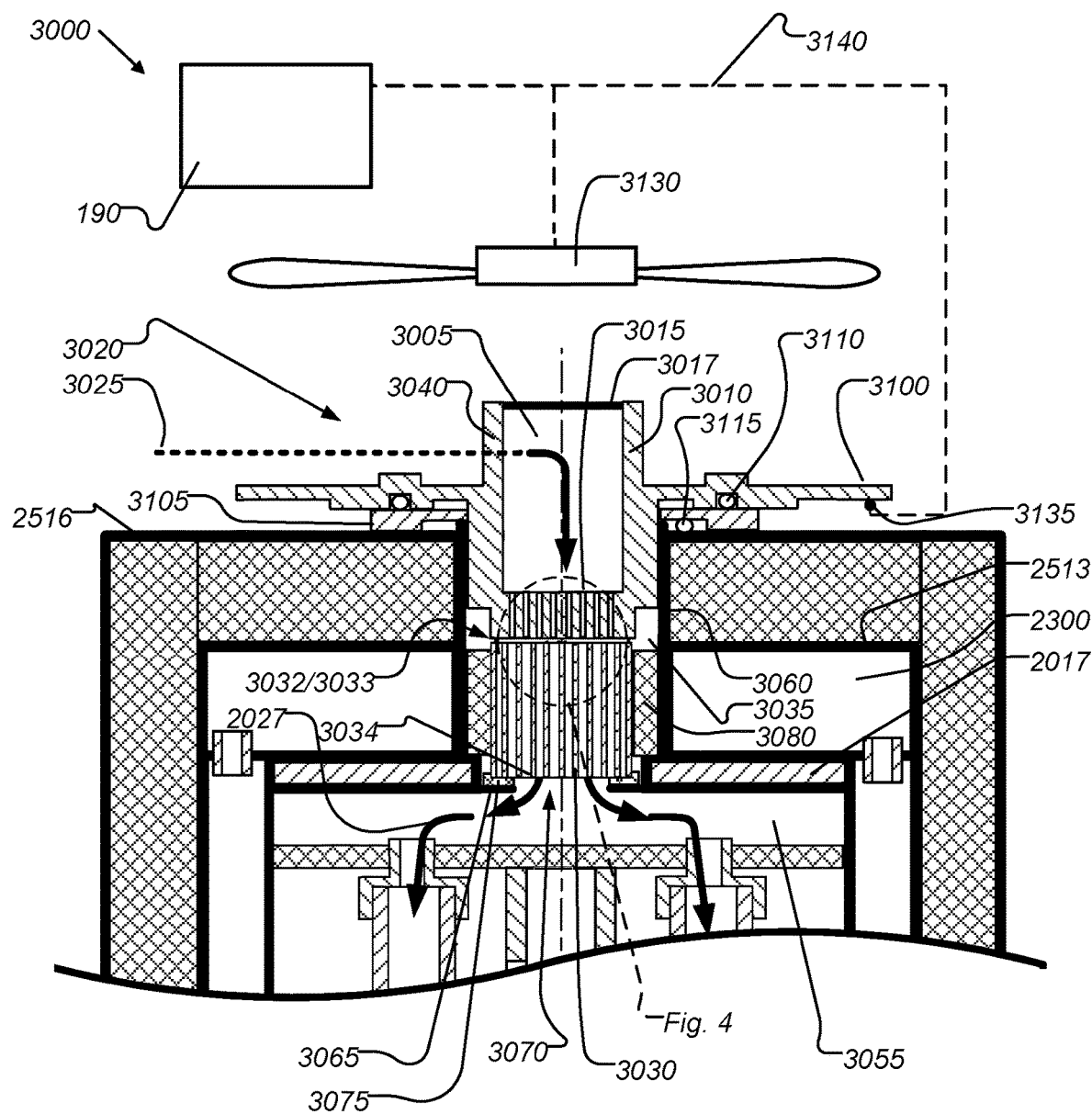
FIG. 3 depicts a schematic side section view taken through a non-limiting exemplary fuel reformer module according to the invention.
Figure 4:
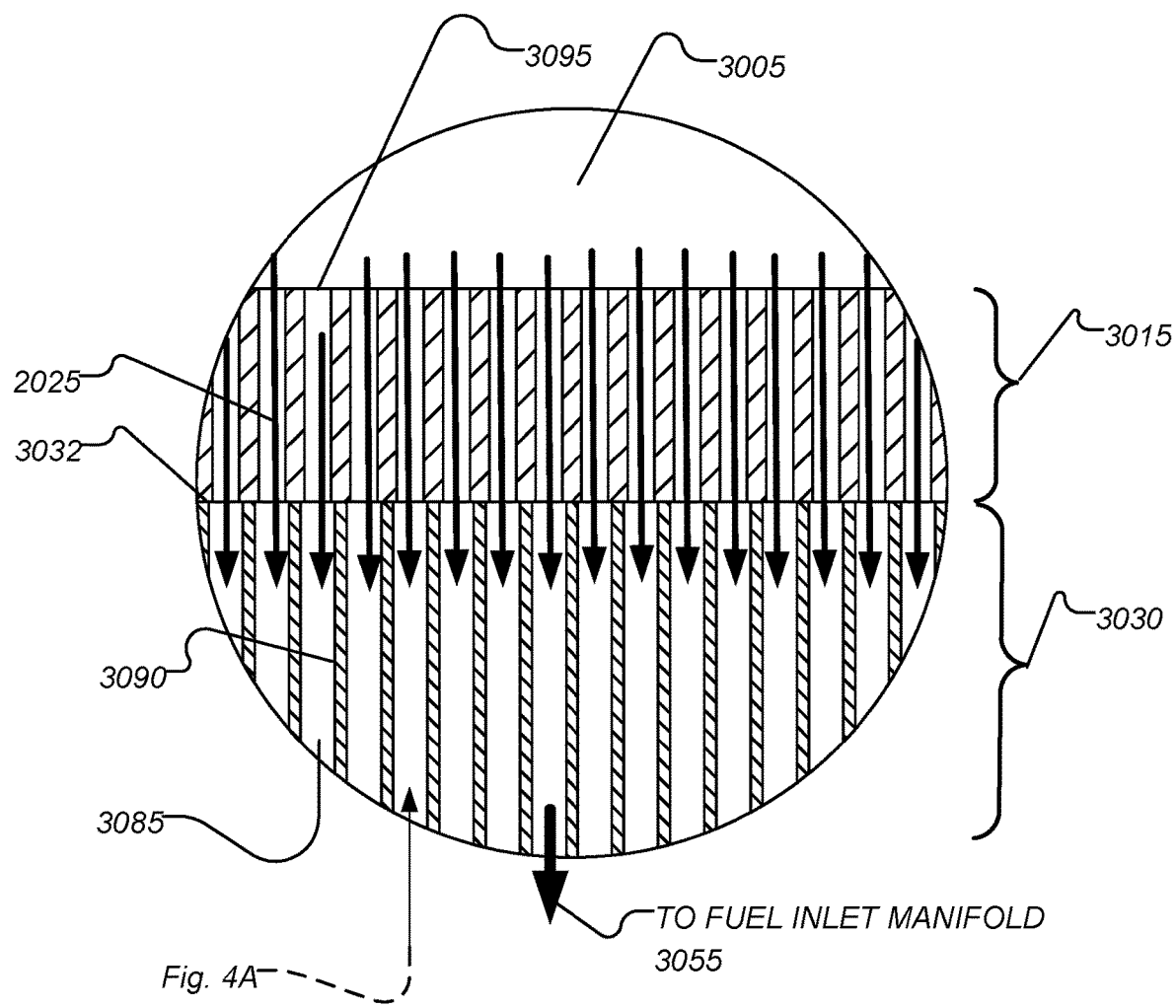
FIG. 4 depicts a schematic side section view of a non-limiting exemplary catalyzing body embodiment of a SOFC system according to the invention.
Figure 4A:
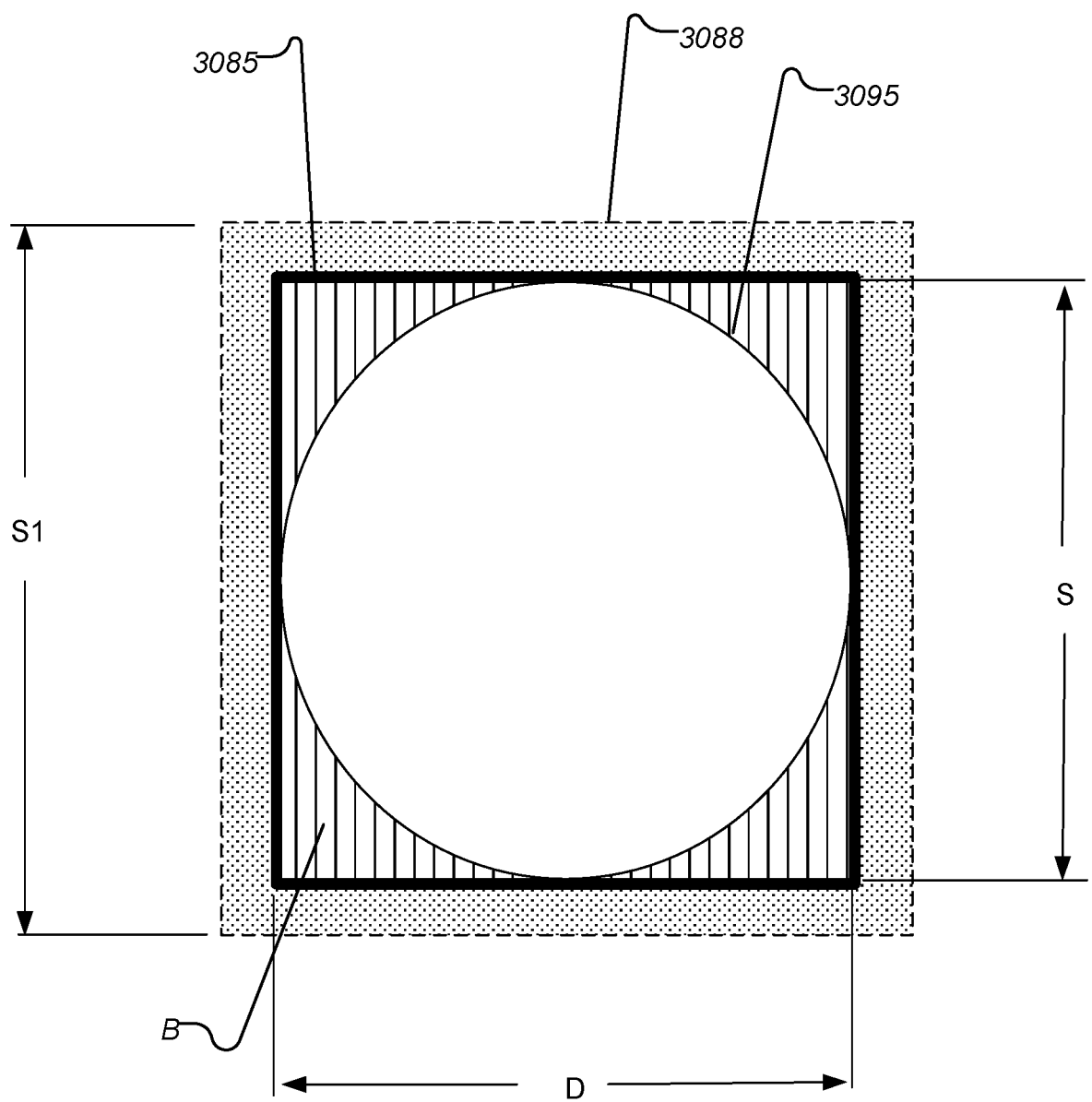
FIG. 4A is a schematic diagram depicting surface area of the reactor base wall that is available to absorb thermal energy being radiated from catalyst fuel passages according to the present invention.

Referring now to FIGS. 2-4 a fuel reformer system (3000) according to the present invention is shown in a schematic side section view in FIG. 3 and partially in exploded side section view in FIGS. 4 and 4A. The fuel reformer system (3000) comprises a fuel reformer module (3020) mounted above a fuel inlet manifold (3055). The fuel reformer module (3020) includes a fuel reactor body (3040) configured to receive an incoming fuel air mixture (3025), i.e. unreformed fuel, into a cylindrical fuel chamber (3005) which is bounded by an annular perimeter wall (3010), by a reactor shield base wall (3015) and a by a fuel chamber cap (3017). In a preferred embodiment, fuel chamber cap (3017) is welded to the annular side wall (3010). The fuel reformer system (3000) further includes a cylindrical catalyzing body (3030). Each of the fuel reactor body (3040) and the cylindrical catalyzing body (3030) is installed into a cylindrical catalyzing cavity (3035) with the cylindrical catalyzing body (3030) positioned just above the fuel inlet manifold (3055) and the fuel reactor body (3040) position just above the cylindrical catalyzing body (3030). Each of the fuel reactor body (3040) and the cylindrical catalyzing body (3030) is configured to provide fluid communication between the cylindrical fuel chamber (3005) and the fuel inlet manifold (3055).

A preferred reactor body material has a coefficient of thermal conductivity greater than 100 W/(m° K) and sufficient mass to rapidly conduct thermal energy away from the interface between the fuel reactor body (3040) and the catalyzing body (3030). A preferred catalyzing body material comprises a ceramic substrate having a coefficient of thermal conductivity of less than about 40 W/m° K in order to discourage thermal conduction through the ceramic substrate, either longitudinally or radially. Ideally the present invention is configured to allow the catalyzing body (3030) to reach a state of thermal equilibrium during operation. More specifically the thermal equilibrium prevents or reduces thermal gradients along the radial axis of the catalyzing body which helps to prevent local hot spots that can burn through the catalyzing layers (3090).

In the present non-limiting exemplary embodiment the cylindrical catalyzing cavity (3035) has a side wall formed by an inside diameter of the annular enclosure wall (3060) which is formed with its longitudinal central axis coaxial with the central longitudinal axis (2060), shown in FIG. 2. The cylindrical catalyzing cavity (3035) includes two open ends each forming a circular aperture with one circular aperture passing through the disk shaped outer top wall (2516) of the outer enclosure and the other circular aperture passing through the disk shaped top end wall (2017) of the hot zone enclosure.

In a preferred embodiment the annular enclosure wall (3060) is formed to be less thermally conductive that the fuel reactor body (3040) in order to discourage thermal conduction between the annular enclosure wall (3060) and the fuel reactor body (3040). In a preferred embodiment, the annular enclosure wall (3060) comprises Hastelloy or Monel which each have a high nickel content to resist oxidation damage and which each have suitable service temperatures ratings, e.g. exceeding 400° C., and which each have a coefficient of thermal conductivity of less than about 25.0 W/(m° K). Additionally the annular enclosure wall (3060) is thin walled, e.g. between 0.02 and 0.1 inches thick to further disclosure thermal conduction there through.

The annular enclosure wall (3060) is thermally conductively connected to the disk shaped top end wall (2017) at its lower open end which is part of the hot zone enclosure walls defined above as the first thermally conductive pathway. The annular enclosure wall is thermally conductively connected to the disk shaped outer top wall (2516) at its top open end which is part of the outer enclosure walls defined above as the third thermally conductive pathway. The annular enclosure wall (3060) is thermally conductively connected to the intermediate top wall (2513) between its top and bottom open ends and the intermediate top wall is part of the intermediate enclosure walls defined above as the second thermally conductive pathway. Thus according to one aspect of the present invention the annular enclosure wall (3060) is formed as a fourth thermally conductive pathway that is thermally conductively connected with each of the first thermally conductive pathway, the second thermally conductive pathway and the third thermally conductive pathway.

A catalyzing body support flange (3065) extends from or is formed by the disk shaped top end wall (2017). The catalyzing body support flange (3065) is sized to define a diameter of a circular aperture (3070) which is small enough to prevent the cylindrical catalyzing body (3030) from passing through the circular aperture (3070). A first annular washer (3075) is disposed between the catalyzing body support flange (3065) and a bottom surface of the cylindrical catalyzing body (3030). The first annular washer (3075) provides a gas seal between the cylindrical catalyzing cavity (3035) when a longitudinal downward pressure is applied to the cylindrical catalyzing body (3030). Additionally the first annular washer (3075) is configured as a thermal insulator to thermally isolate the catalyzing body support flange (3065) from the disk shaped top end wall (2017). Preferably, first annular washer (3075) comprises alumina formed with sufficient thickness and with appropriate outer edge diameter dimension to provide the desired gas sealing and thermal insulating properties. More generally, the first annular washer (3075) preferably comprises a very low thermal conductivity non-porous material, e.g. having a coefficient of thermal conductivity of less than 40 W/m° K, which includes most ceramic materials.

A diameter of the cylindrical catalyzing cavity (3035) is sized to receive an annular thermally insulating element (3080) into the cylindrical catalyzing cavity (3035) surrounding the cylindrical catalyzing body (3030). The annular thermally insulating element (3080) is provided to thermally isolate the cylindrical catalyzing body (3030) from the annular enclosure wall (3060). Additionally the annular insulating element (3080) is configured to precisely center the cylindrical catalyzing body (3030) with respect to a central longitudinal axis of the cylindrical catalyzing cavity (3035) and may be further configured to angularly orient the cylindrical catalyzing body (3030) for precise angular alignment with one or more features of the fuel reactor body (3040). Both the first annular washer (3075) and the annular insulating element (3080) are provided to prevent thermal conduction from the enclosure walls, e.g. the annular enclosure wall (3060) and the top end wall (2017), to the catalyzing body (3030) which is preferably operating with a higher temperature than the cylindrical catalyzing body.

The cylindrical catalyzing body (3030) comprises a solid non-porous ceramic substrate formed to include a plurality of longitudinally disposed catalyst fuel passages (3085) each passing completely through the cylindrical catalyzing body (3030). Each catalyst fuel passage (3085) provides an individual fuel conduit that extends longitudinally through the cylindrical catalyzing body (3030). Accordingly each catalyst fuel passage provides fluid communication between the cylindrical catalyzing cavity (3035) and the fuel inlet manifold (3055). Additionally inside surfaces of each of the catalyst fuel passage (3085) are formed with a catalyst layer (3090) coated thereon. The catalyst layer (3090) comprises a catalyst material usable to reform the incoming fuel air mixture (3025) by catalytic partial oxidation, which is an exothermic reaction that causes partial combustion of the fuel air mixture (3025). In the present non-limiting exemplary embodiment a preferred catalyst layer (3090) comprises a metallic or oxide phase of rhodium (Rh). Other suitable catalyzers usable for the catalyst layer (3090) include Pt, Pd, Cu, Ni, Ru, and Ce. The solid non-porous ceramic substrate used to form the cylindrical catalyzing body (3030) preferably comprises alumina or any other non-porous material having a relatively low coefficient of thermal conductive as compared to the coefficient of thermal conductive of the fuel reactor body (3040). In the present non-limiting embodiment wherein a ceramic substrate is used the coefficient of thermal conductive of the catalyzing body is less than 40 W/m° K.

As will be described further below the incoming fuel air mixture (3025) enters the cylindrical fuel chamber (3005), passes through the reactor shield base wall (3015), enters each of the catalyst fuel passages (3085), where it reacts with the catalyst layer (3090), and then enters the fuel inlet manifold (3055) where it is distributed into each of the tubular fuel cells (2080).

8.5 Fuel Reactor Body

Referring now to FIGS. 2, 3, 4, and 4A, the fuel reactor body (3040) is disposed partially within the cylindrical catalyzing cavity (3035) and partially extending through the disk shaped outer top wall (2516) into the cold zone such that at least a portion of the fuel reactor body (3040) is exposed to ambient air. The annular perimeter wall (3010) provides a cylindrical side wall of the cylindrical fuel chamber (3005). The fuel input conduit (2025) passes through the annular perimeter wall (3010) to deliver incoming air fuel mixture (2025/3025) into the cylindrical fuel chamber (3005). As will be recognized, other geometries are usable to form the annular perimeter wall (3010) and fuel chamber (3005) which can have a square, rectangular or other cross-section in transverse planes thereof.

The reactor shield base wall (3015) comprises a circular bottom wall of the cylindrical fuel chamber (3005) that is preferably integrally formed with the annular perimeter wall (3010). However, the reactor shield base wall (3015) and annular perimeter wall can be formed as separate parts and joined together, for example by welding, soldering, mechanical fasteners, and or other suitable joining techniques. A plurality of base wall fuel passages (3095) each passes completely through the reactor shield base wall (3015) along a longitudinal axis, e.g. with each base wall fuel passage parallel with the central longitudinal axis (2060). Each base wall fuel passage (3095) provides a fuel conduit that extends longitudinally through the reactor shield base wall (3015). Moreover each base wall fuel passage (3095) is longitudinally aligned with and in fluid communication with a corresponding one of the plurality of catalyst fuel passages (3085) that pass through the cylindrical catalyzing body (3030).

As shown in FIGS. 4 and 4A, an interface (3032) is defined by a bottom external surface of the reactor shield base wall (3015) and a top or input surface of the cylindrical catalyzing body (3030). In a non-limiting exemplary embodiment one or the other or both of the two surfaces that form the interface (3032) includes a raised feature or features (3033). The raised features may include a circular ring or a plurality of discreet raised bumps, preferably three, formed at one more locations extending from the bottom surface of the reactor shield base wall (3015) in a position that causes the raised features to contact the opposing surface at the interface (3032) in order to provide a small gap between the two opposing surfaces. More generally the interface (3032) is formed with a gap between the bottom surface of the reactor shield base wall (3115) and the top surface of the cylindrical catalyzing body (3030). The gap is provided to all allow radiant thermal energy exiting from each of the catalyst fuel passages to impinge onto the bottom surface of the reactor shield base wall (3015) so that substantially all of the bottom surface of the reactor shield base wall (3015) is available to absorb thermal radiation impinging thereon.

At the interface (3032) each base wall fuel passage (3095) is aligned with its corresponding catalyst fuel passages (3085) along a substantially coaxial longitudinal axis. In this arrangement the fuel air mixture (2025) being delivered into the cylindrical fuel chamber (3005) passes out of the cylindrical fuel chamber (3005) through each of the plurality of base wall fuel passages (3095) flows across the gap provided between the surfaces of the interface (3032) and enters each of the corresponding catalyst fuel passage (3085). Once inside the catalyst fuel passages (3085) the fuel air mixture begins to react with the catalyst coated sidewall surfaces (3090) and the fuel air mixture begins the catalyzed partial oxidation reaction used to convert the fuel air mixture into reformed fuel or syngas. According to an aspect of the present invention, thermal energy generated by the CPDX reaction taking place inside the catalyst fuel passages (3085) is radiated onto the bottom surface of the reactor shield base wall (3115) for partial absorption thereby. Additionally thermal energy generated by the CPDX reaction taking place inside the catalyst fuel passages (3085) is radiated onto inside surfaces of the base wall fuel passages (3095) for partial absorption thereby.

The fuel reactor body (3040) is formed from materials having a relatively high thermal conductivity as compared to the thermal conductivity of the ceramic material used to form the cylindrical catalyzing body (3030). A preferred reactor body material has a coefficient of thermal conductivity greater than 100 W/(m° K). Thus in one non-limiting example embodiment the entire fuel reactor body (3040) is formed from a unitary piece of copper or a copper alloy, from a unitary piece of beryllium or a beryllium alloy, from an unitary piece of aluminum or an aluminum alloy, of a unitary piece of brass or a brass alloy, of a unitary piece of tungsten or a tungsten alloy, wherein the alloys may include molybdenum, nickel, chromium, brass, tungsten, or the like. In the present example, unitary means the entire fuel reactor body (3040) is formed from a single piece of metal, e.g. cast or machined. In alternate embodiments the fuel reactor body (3040) can be formed from a plurality of cast or machined elements that assembled together, e.g. welding, brazing, or mechanically fastening in a manner that provides a continuous thermally conductive path. In any case a desired material has a coefficient of thermal conductivity that is at least greater than 100 W/(m° K) with some embodiments using materials having a coefficient of thermal conductivity in excess of 300 W/(m° K). Additionally the wall thicknesses and or thermal mass of the fuel reactor body (3040) is sufficient to promote rapid thermal conduction from a high temperature region of the reactor body (3040) proximate to the interface (3032) to a low temperature region of the reactor body (3040), e.g. the region disposed outside the hot zone, and to minimize temperature gradients between the interface (3032) and the elements of the reactor body that are disposed outside the hot zone. An additional characteristic of the reactor body material is that it preferably has a service temperature at least exceeding 200° C. and preferably up to 1000° C.

In the present non-limiting exemplary embodiment, the fuel reactor body (3040) is formed from aluminum, preferably the Aluminum 6061 alloy, with a coefficient of thermal conductivity of approximately 167 W/(m° K). Aluminum and aluminum alloys are preferred because they spontaneously form a stable oxide layer that protects the bulk structure from corrosive oxidative damage and can be used without an additional applied protective coating. Additionally, the aluminum and aluminum alloys can be anodized to prevent or reduce surface oxidation. In a preferred embodiment the entire fuel reactor body (3040) comprises a solid element comprising a single piece of aluminum 6061 alloy; however the fuel reactor body (3040) may comprise an assembly formed by assembling a plurality of individual subassembly elements together using mechanical fasteners, welding or brazing, or using interlocking mechanical features, or the like, without deviating from the present invention.

More specifically according to an important aspect of the present invention the relative thermal conductivity of each of the cylindrical catalyzing body (3030), the annular enclosure wall (3060) and the fuel reactor body (3040) is selected to promote thermal conduction from the interface (3032) to a heat dissipating flange (3100), disposed outside the hot zone, and to promote absorption of thermal radiation impinging on surfaces of the reactor shield base wall (2015). This is accomplished by configuring the fuel reactor body (3040) as the most thermally conductive element local to the interface (3032) and by configuring the fuel reactor body (3040) to extend outside the hot zone where it is either actively cooled e.g. by moving air passing over the surfaces of the fuel reactor body or passively cooled, e.g. by simply exposing surfaces to the fuel reactor body (3040) to ambient air. Thus the configuration of the fuel reactor body (3040) establishes and maintains a temperature gradient between the interface (3032) and external ambient air, outside the hot zone, by providing a thermally conductive path between the interface (3032) and a cooler portion of the fuel reactor body which are provided by exposing a portion of the fuel reactor body to ambient air. The resulting temperature gradient between the portion of the fuel reactor body exposed to ambient air and the portion of the reactor body proximate to interface (3032) tends to promote substantially continuous thermal energy conduction through the fuel reactor body (3040) from the interface (3032) to the portion of the fuel reactor body that is exposed to ambient air.

The fuel reactor body (3040) includes a heat dissipating flange (3100), e.g. a disk shaped flange radially extending from the annular perimeter wall (3010). The heat dissipating flange (3100) is supported above the disk shaped outer top wall (2516) external to the outer enclosure and exposed to surrounding air. Preferably the heat dissipating flange (3100) is integrally formed with the annular perimeter wall (3010) but the heat dissipating flange (3100) may comprise a separate element attached to the annular perimeter wall (3010) by welding, soldering, mechanical fasteners, or other attaching means.

An annular seal plate (3105) is disposed between the disk shaped outer top wall (2516) and the heat dissipating flange (3100) to provide a mechanical interface between a top surface of the disk shaped outer top wall (2516) and a bottom surface of the heat dissipating flange (3100). The annular seal plate (3105) includes a centered through hole sized to receive the annular perimeter wall (3010) there through. An O-ring seal element (3110), or the like, is disposed between the annular seal plate (3105) and the heat dissipating flange (3100), e.g. in an O-ring groove, and serves to gas seal a top portion of the cylindrical catalyzing cavity (3035). A second O-ring seal element (3115), or the like, may be provided between a top surface of the disk shaped outer top wall (2516) and a bottom surface of the annular seal plate (3105).

Both the annular seal plate (3105) and the heat dissipating flange (3100) are attached to the disk shaped outer top wall (2516) by fasteners, or the like, in a manner that applies a downward force against the fuel reactor body (3040) in order to seat the bottom surface of the reactor shield base wall (3015) against the top surface of the cylindrical catalyzing body (3030) at the interface (3032), or the raised surfaces (3033) formed thereon, and further in order to compress the O-ring seal element (3110).

Figure 6:
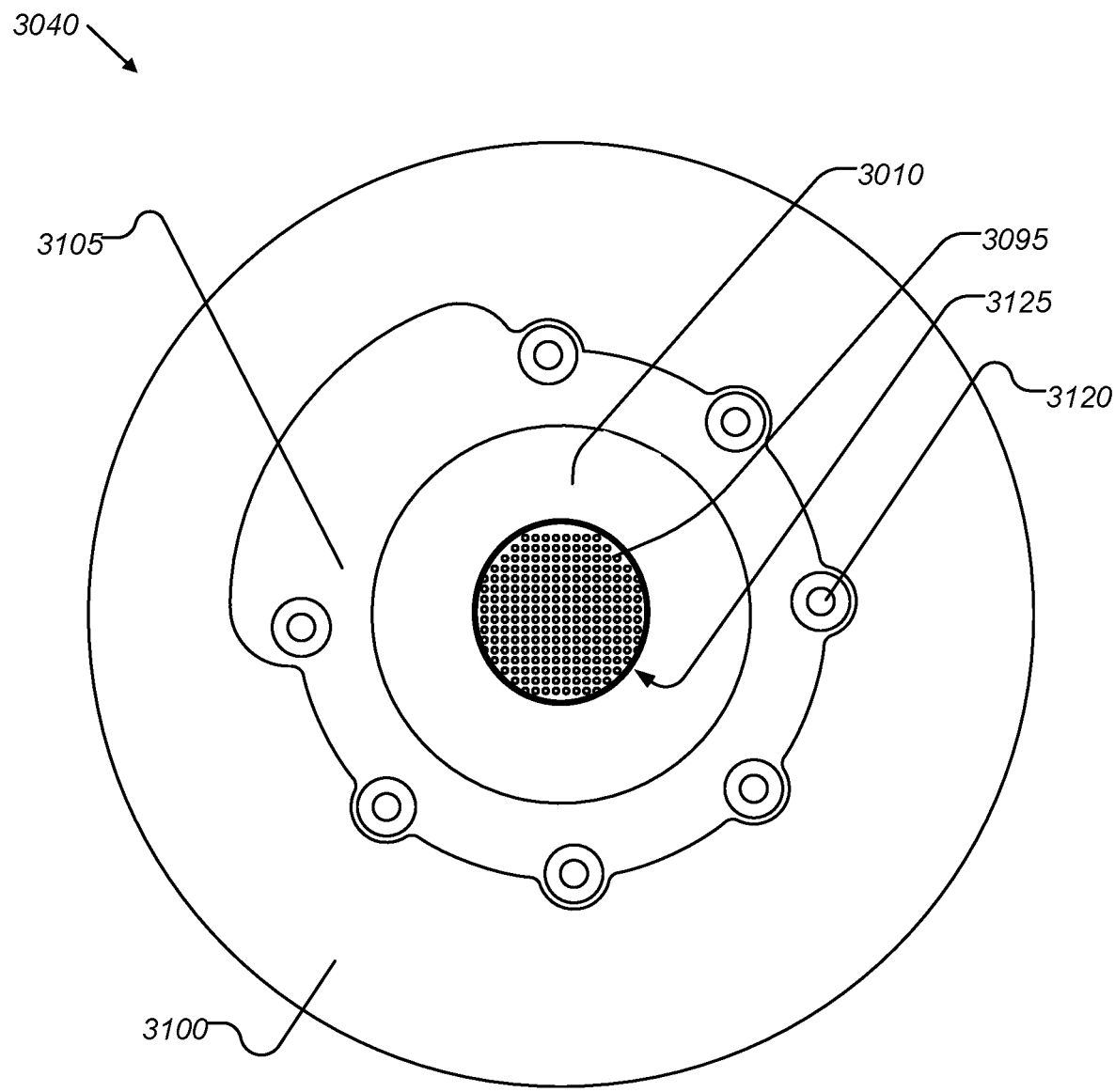
FIG. 6 depicts a bottom schematic section view taken through a non-limiting exemplary fuel reformer module according to the invention.

Referring now to FIG. 6, a schematic top section view of the fuel reactor body (3040) depicts the heat dissipating flange (3100) radially extending from the annular perimeter wall (3010). Fasteners (3120) extend through the dissipating flange (3100) and the annular seal plate (3105) to attach the heat dissipating flange (3100) and the annular seal plate (3105) to the disk shaped outer top wall (2516). The annular perimeter wall (3010) extends radially outside the annular enclosure wall (3060) such that the seal plate (3105) seals the cylindrical catalyzing cavity (3035). An array (3125) of base wall fuel passages (3095) is depicted passing through the reactor shield base wall (3015).

Referring now to FIG. 3, the fuel reformer system (3000) may include external cooling and temperature sensing elements readable by the electronic controller (190). In one non-limiting example embodiment, an air moving element (3130), such as a rotary fan blade attached to a rotary motor, operable by the electronic controller (190), is disposed to direct air flow over the heat dissipating flange (3100), thereby increasing convective thermal energy transfer from the flange (3100) to the surrounding ambient air. Additionally a temperature sensing element (3135) in contact with a surface of the heat dissipating flange (3100), or one or more other surfaces of the fuel reactor body (3040) is usable to deliver a temperature signal to the electronic controller (190) over a communication path (3140). Operation of air moving element (3130) may be constant or may be variably triggered by changes in the temperature signal emitted by the temperature sensing element (3135). In one non-limiting operating mode the air moving element (3130) is activated when the temperature sensing element (3135) reports a temperature that is above a desired high temperature limit, e.g. above 50° C., and the air moving element (3130) is deactivated when the temperature sensing element (3135) reports a temperature that is below a desired high temperature limit, e.g. below 45° C.

Additionally, the temperature signal emitted by the temperature sensing element (3135) is usable to control operation of the cold start combustion chamber (2300) such as to stop fuel flow to the cold start combustion chamber (2300) when the temperature of the heat dissipating flange (3100) reaches a desired steady state temperature range.

In an example operating mode the electronic controller (190) receives temperature signals from the temperature sensing element (3135) over communication pathway (3140) and determines an instantaneous flange temperature based thereon. The electronic controller (190) then determines whether the flange temperature is within one or more desired temperature ranges and if not carries out various commands such as to operate or stop operating the air moving element (3130) and or to start or stop fuel flow to the cold start combustion chamber (2300) or to cease fuel delivery to the fuel reformer system (3000) by commanding the fuel delivery module (197) to close a gas flow actuator valve, or the like, when the instantaneous temperature indicated by the temperature sensing element (3135) exceeds a safe operating limit. In one non-limiting operating mode the electronic controller (190) is configured to activate the air moving element (3130) when the temperature of the heat dissipating flange (3100) exceeds 50° C. In other example embodiments the air moving element (3130) may have multiple operating modes usable to move more or less air depending on need based on different temperature thresholds.

8.6 The Interface Configuration

Referring now to FIG. 4 an exploded side section view of the interface (3032) between corresponding pairs of base wall fuel passages (3095) and catalyst fuel passages (3085), shows that each corresponding pair of reactor shield base wall fuel passages (3095) and catalyst fuel passages (3085) is aligned along a common longitudinal axis. Thus each corresponding pair of base wall fuel passages and catalyst fuel passages provides a vertical flow path through which the fuel air mixture passes from the cylindrical fuel chamber (3005) to the fuel inlet manifold (3055). As noted above a gap may be provided between the mating surface of the interface (3032) to expose surfaces of the reactor shield base wall (3015) to thermal radiation being emitted by the CPDX reaction but the gap is not shown in FIG. 4 to simplify the disclosure. As indicated by the reference number (3090) a catalyst layer is formed on the sidewall of each catalyst fuel passage (3090). As is further shown in FIG. 4, a pointer referring to FIG. 4A indicates that FIG. 4A depicts a schematic view of the interface (3032) as viewed from inside a catalyst fuel passage (3085) looking toward its fuel input end. In the present non-limiting example embodiment the diameter (D) of each of the circular base wall fuel passages (3095) is 1.3 mm and the thickness of the reactor shield base wall is 13 mm such that each fuel passage (3095) is 13 mm long. In a preferred embodiment the ratio of fuel passage longitudinal length to its diameter is at least 5, preferably 10 and up to 20. The side wall dimension of each of the square catalyst fuel passages (3085) is 1.3 mm and the thickness of the cylindrical catalyzing body (3030) is about 25.4 mm such that each catalyst fuel passage (3085) is 25.4 mm long. In a preferred embodiment the ratio of catalyzing passage longitudinal length to its square side dimension is at least 10, preferably 15-25 and up to 40.

The cylindrical catalyzing body (3030) has a circular cross-section and an array of catalyzing fuel passages (3085) is formed within the circular cross-section over a circular region having a diameter of 25.4 mm (1.0 in.) Each of the catalyzing fuel passages of the array has a square cross-section and extends completely through the cylindrical catalyzing body (3030). In the present non-limiting exemplary embodiment each square catalyzing fuel passage has a side dimension of 1.3 mm and a length of 25.4 mm. Alternately, the catalyzing body (3030) and the array of fuel passages can have other non-circular cross-sections without deviating from the present invention.

The reactor shield base wall (3015) is formed with an array of circular base wall fuel passages (3095) formed within a 25.4 mm (1.0 in.) diameter circular array region opposed to the circular array region of the cylindrical catalyzing body (3030). In the present non-limiting exemplary embodiment each circular base wall fuel passage (3095) has a diameter of 1.3 mm and a length of 13.0 mm. Alternately, the reactor shield base wall (3015) and the array region formed thereon can have other non-circular cross-sections without deviating from the present invention. As described above each circular base wall fuel passage (3095) in the array of base wall fuel passages is coaxial with one of the square catalyst fuel passages (3088) in the array of catalyst fuel passages such that a central longitudinal axis of each base wall fuel passage (3095) is coaxial with a central longitudinal axis of a corresponding catalyst fuel passage (3085).

Solid material of the reactor shield base wall (3015) surrounds each circular base wall fuel passage and solid material of the cylindrical catalyzing body (3030) surrounds each square catalyst fuel passage. In a non-limiting exemplary array pattern, all the passages are arranged in a plurality of parallel linear arrays. Each linear array is offset from an adjacent linear array by the same pitch dimension of 1.2 times the circular passage diameter. In the present example the pitch dimension is 1.56 mm. Based on this non-limiting exemplary array disposed over a 25.4 mm diameter circle, the total number or circular passages (3095) in the circular array area is approximately 208.

The combined area of the 208 passages each having a 1.3 mm diameter is 276 mm². The total area of the 25.4 mm diameter array area is 507 mm². Thus the area of solid material in the circular array area is approximately 231 mm² such that the bottom surface of the reactor shield base wall (3015) provides about 231 mm² of surface area facing the interface (3032) that is available to absorb radiant thermal energy impinging thereon. In the present example embodiment the ratio of solid surface area to hole diameter area is 0.84. As a percentage of the total area of the circular array about 54% of the total area is circular passage area and about 46% of the total area is solid material area. As will be recognized by those skilled in the art the ratio of surface area to hole diameter area can be increased by decreasing the diameter of the circular base wall fuel passages. Since the surface area at the interface (3032) is impinged by radiant thermal energy emitted by the CPDX reaction, increasing the solid surface area, without a change in temperature, increases thermal energy absorption into the reactor shield base wall (3015). In a preferred embodiment the ratio of solid surface area to hole diameter area ranges between 0.75 to 0.9.

As noted above radiant thermal energy emitted by the CPDX reaction also enters the circular base wall fuel passages (3095) and at least a portion of the radiant thermal energy impinges onto inside surfaces thereof. While the incident angle of radiant thermal energy impinging on the inside surfaces of circular base wall fuel passages (3095) is nearly grazing, the passages are long compared to the passage diameter and reflected energy, even when reflected at near grazing incidence is scattered and ultimately impinges onto and reflects from the inside surfaces over many reflection cycles as it traverses a fuel passage (3095). The total surface area of inside surfaces of all 208 circular passages is about 11043 mm².

Referring now to FIG. 4A the figure depicts the interface (3032) of a single circular fuel passage (3095) and a single square catalyst fuel passage (3085) as viewed from the fuel inlet manifold (3055). As further shown, according to the present invention, each base wall passage (3095) has a circular cross-section having a diameter (D) along its entire longitudinal length and each catalyst fuel passage (3085) has a square cross-section having a side dimension (S) along its entire longitudinal length. In the non-limiting exemplary embodiment of FIG. 4A, the diameter (D) and the side length (S) are equal and an area (B), shown filled with vertical lines, is an exposed surface area of the bottom surface of the reactor shield base wall (3015). The surface area (B) is located at the interface (3032) proximate to the input end of each catalyst fuel passage (3085) and is specifically provided to absorb thermal radiation being radiated from the catalyzing surface (3090). Additionally when a gap between the opposing surfaces of the interface (3032) is provided, thermal radiation enters the gap in part by reflecting from surface area (B).

Equation (1) below provides the area of surface area (B):

$$A_s - A_c = S^2 - \pi(D/2)^2 \qquad \text{EQU: 1}$$

where $A_s$ is the area of a square (3085) having side length (S)

$A_c$ is the area of a circle (3095) having diameter (D).

In the case where S=D the surface area $A_B$ of the surface area (B) is:

$$(A_B) = S^2(1 - \pi/4) = 0.2146 S^2 \qquad \text{EQU: 2}$$

In other words the area of surface (B) is about 21% of the area of the square (3085). As will be recognized, the area AB can be increased to increase exposure of the surface (B) to thermal radiation being generated inside the catalyzing fuel passages e.g. by increasing the square side dimension from (S) to (S1), or by decreasing the diameter (D) of the circular passages (3095). When the side dimension of a catalyst fuel passage is increased from (S) to (S1) the area SB can be increased to 50% of the area of the square of dimension (S1) when the ratio S1/D is equal to about 1.253.

The surface area (B) is directly exposed to the CPDX reaction taking place inside the square catalyst fuel passages (3085) and is in the best position to absorb thermal energy radiating out of the catalyst fuel passages. In a non-limiting exemplary embodiment of the present invention even when there is no gap at the interface (3032) the surface (B) as well as the inside surfaces of the base wall fuel passages (3095) provide sufficient surface area of the cooler reactor shield base wall (3015) to absorb sufficient radiant thermal energy emitted by the CPDX reaction to prevent catalyst layer burn through. However, as will be recognized by those skilled in the art, when the gap is provided, additional radiant thermal energy enters the gap and may impinge onto and be reflected from the cooler solid material surface areas of the reactor shield base wall (3015) over many cycles to absorb additional thermal energy emitted by the CPDX reaction.

8.7 Thermal Energy Transfer

Without wishing to be bound by theory, Applicants believe that the exothermic catalyzed partial oxidation reaction is initiated immediately upon contacting the catalyst layer (3090) proximate to the interface (3032). Additionally Applicants believe that the exothermic catalyzed partial oxidation reaction reaches its maximum temperature proximate to the interface (3032) with the maximum temperature approximately between 900 and 1000° C., depending on the fuel material, the ratio of fuel to air mixture, and other factors. In response to the rapid heating proximate to the interface (3032) the temperature of the fuel air mixture rapidly increases and thermal energy is absorbed by the fuel air mixture as well as by the catalyst layers (3090). In response to the temperature increase, the fuel air mixture rapidly expands in volume to fill the catalyst fuel passage (3085) and exit to the fuel inlet manifold. During the gas expansion more of the fuel air mixture comes into contact with the catalyzing layer (3090) distal from the interface (3032) to participate in the exothermic catalyzed partial oxidation reaction, thereby further heating and expanding the fuel/air mixture. Thus most of the thermal energy generated by the catalyzed partial oxidation reaction is absorbed by the fuel/air mixture and carried out of the catalyst fuel passage to the fuel inlet manifold (2055). In an example operating mode the volume of fuel/air mixture delivered into the CPDX reactor is believed to generate about 300 watts during the CPDX reaction.

A portion of the thermal energy generated by the catalyzed partial oxidation reaction is absorbed by the catalyzing layer (3090). In the present example the catalyst layer is metallic (e.g. Rh), with a coefficient of thermal conductivity of about 150 W/m° K. Thus thermal energy absorbed by the catalyzing layer (3090) is thermally conducted through the catalyzing layer thickness to the reach ceramic catalyzing body (3030) and is further conducted along the longitudinal length of the catalyzing layer. However since the catalyst body (3030) is a ceramic material with a coefficient of thermal conductivity of about 45 W/m° K, the heat flux density (W/m$^2$) entering the ceramic material is low resulting in thermal energy absorbed by the catalyzing layer being reemitted into the catalyzing fuel passages instead of being thermally conducted into the ceramic material. However this result is desirable since the low heat flux density along the radial axis of the ceramic catalyzing body prevents thermal energy from being conducted radially away from the catalyzing fuel passages to the extent that thermal energy is either a) transferred to the fuel air mixture inside the fuel passages, or b) radiated out of the ends of the fuel passages either to the fuel inlet manifold or onto the surface area (B) described above, or c) radiated onto other exposed solid material surfaces of the reactor shield base wall, e.g. by entering the gap provided at the interface, or d) radiated into the circular base wall fuel passages to either be transferred to the incoming gas air mixture by convective heat transfer, or e) radiated onto inside surfaces of the base wall fuel passages (3095) to be absorbed thereby.

Thus thermal energy absorbed by the catalyzing layer is not readily dissipated to the ceramic catalyzing body (3030). Instead the thermal energy is reemitted into the catalyzing fuel passage to further heat the fuel air mixture. Additionally thermal energy emitted or reflected by the catalyzing layer impinges onto other surfaces of the catalyzing layer and is partially absorbed and partially reflected thereby. However without at least one outlet for thermal radiation to exit the catalyst fuel passage the energy absorption rate of the catalyzing layer (3090) may exceed the energy reemission rate thereby causing the temperature of the catalyzing layer to continue to increase until it reaches a temperature that causes the catalyzing layer to burn off causing permanent damage to catalyzing fuel passages.

As described above Applicants believe that the total power generated by the CPDX reaction is 300 W. Using the Stefan Boltzmann equation listed below as Equation 3 the total power that can be absorbed by the collective surface area (B) shown in FIG. 4A, i.e. based on 208 base wall passages (3095) can be estimated given the surface area and temperature.

$$P = e\sigma A S_f(T_c^4 - T_b^4) \qquad \text{EQU. 3}$$

where
P=net absorbed power (watts);
e=surface emissivity;
$\sigma = 5.6703 \times 10^{-8}$ (W/m$^2$K$^4$) the Stefan Boltzmann constant;
A=area onto which radiation is radiated (m$^2$);
Sf—a form factor related to the incidence angle at which the radiation impinges on the surface area A
$T_c$=temperature of radiation source (° K);
$T_b$=temperature of the surface area A (° K).

Of particular importance is the fact that when Tc and Tb are equal, Equation 3 shows that the net radiated power absorbed by the reactor shield base wall (3015) is zero. Thus without cooler surface areas provided by the reactor shield base wall (3015) the surface temperatures inside the catalyst fuel passages can continue to increase until the catalyst layer overheats and burns through.

In a non-limiting example embodiment wherein each square catalyst fuel passage (3085) has a side dimension (S) equal to 1.3 mm (0.0013 m) and each circular base wall passage (3095) has a diameter of 1.3 mm, the collective area of all the surface areas (B), denoted ABt for an array of 208 passages is 7.38×10−5 m$^2$. Assuming that the CPDX reaction temperature is 1000° C. (1273° K) and the temperature of each surface area AB is 100° C. (373° K) and using the simplified case where the emissivity e=1.0, Equation 3 predicts that the combined surface area ABt can absorb about 11 W or about 3.6% of the power generated by the CPDX reaction.

If a gap is provided at the interface (3032) such that the entire solid surface area of the bottom surface of the reactor shield base wall (3015), denoted AS is potentially available to absorb thermal energy, the available solid material surface area AS is 2.31×10$^{-4}$ m$^2$ and Equation 3 predicts that the area AS can absorb about 34 W or about 11.3% of the power generated by the CPDX reaction.

If in addition the surface area of the inside surfaces of all 208 circular fuel passages (3095) is potentially available to absorb thermal energy, the available surface area of all the circular fuel passages, denoted AP is 1.1043×10$^{-2}$ m$^2$ and Equation 3 predicts that the surface area AP can absorb about 1632 W or about 211% of the power generated by the CPDX reaction.

As a practical matter, the above listed thermal energy absorption power values are calculated using a firm factor Sf=1 which is the case when the thermal radiation impinges the surface at normal incidence. While this may be the case for the surface area ABt, a value of Sf=1 is not realistic for the surfaces areas AS and AP. Additionally as a practical matter the surface emissivity (e) of a heavily oxidized aluminum surface is not 1.0 but instead is about 0.25 or less. Accordingly the energy absorption values are more realistically represented when Equation 3 is used with surface emissivity e=0.25 for all three surfaces areas ABt, AS, and AP and with the form factor Sf=1 for the surface area ABt, and Sf=0.1 for the surface areas AS and AP. In this case, Equation 3 predicts that the surface area ABt potentially absorbs about 2.75 W, the surface area AS potentially absorbs about 0.85 W and the surface area AP potentially absorbs about 44.6 W. Thus the reactor shield base wall (3015) when maintained at about 100° C. potentially absorbs about 16% of the total power emitted by the CPDX reaction.

Those skilled in the art will recognize that additional thermal energy can absorbed by increasing the available surface area or by lowering the temperature of the reactor shield base wall (3015). As noted above according to the present invention the surface temperature of the heat dissipating flange (3100) is preferably maintained in a range of 50-100° C. which due to the high thermal conductivity of the fuel reactor body (3040) likely maintains the temperature of the entire reactor shield body (3040) at nearly the same temperature but provides a thermal gradient between the fuel reactor base wall (3015) and the heat dissipating flange (3100). As noted above this allows thermal energy to be absorbed from the CPDX reaction and prevents the unprocessed fuel passing through the fuel reactor body (3040) from reaching its auto ignition temperature of 295 to 580° C. depending on which fuels are in use.

Thus maintaining the reactor shield base wall (3015) described above at a temperature of 100° C. during operation and providing a small gap, e.g. about 1 mm at the interface (3032) has the potential of absorbing about 43 W of thermal energy or about 14% of the total energy being radiated by the CPDX reaction at a temperature of 1000° C. However those skilled in the art will recognize that increasing the shape factor, increasing the surface area and decreasing the temperature of the fuel reactor body (3040) can remove additional thermal energy from each of the catalyst fuel passage (3085).

8.8 Operating Mode 8.8.1 Cold Start

Referring to FIGS. 1-3, from a cold start, the fuel input module (197) is operated by the electronic controller (190) to deliver a fuel air mixture into the cold start combustion chamber (2300) through a fuel input inlet (2304) and to ignite the fuel air mixture inside the cold start combustion chamber (2300) with an electric igniter (2306) operable by the electronic controller (190). At the same time or shortly thereafter the fuel input module (197) also operates to deliver fuel/air mixture into the fuel reformer module (3020) through the fuel input conduit (2045) and the fuel air mixture passes through the fuel reformer module (3020) to the fuel input manifold (2055). Preferably the initial flow rate of the fuel air mixture being delivered through the fuel reformer module is very low and is intended to merely fill the SOFC system with a nearly stationary volume of fuel air mixture.

The ignited fuel inside the cold start combustion chamber (2300) heats walls of the cold start combustion chamber (2300) but the top end wall (2017) is configured to absorb more thermal energy than the other walls of the cold start combustion chamber. As the temperature of the top end wall (2017) increases, thermal energy is thermally conducted from the top end wall (2017) to other regions of the hot zone enclosure walls (115). Additionally the top end wall (2017) and other walls of the hot zone enclosure (115) begin to emit thermal radiation into the fuel inlet module (2055) which is absorbed by the fuel air mixture contained therein, increasing its temperature. Exhaust gas generated by combusting the fuel air mixture inside the cold start combustion chamber (2300) exits from the cold start combustion chamber (2300) through cold start exit ports (2302) and flows through the air gap (2155) to a system exit port (2165). As the hot exhaust gas flows through the air gap (2010) it radiates thermal energy to outside surfaces of the longitudinal cylindrical side wall (2015) which increase in temperature.

The top end wall (2017) is attached to the longitudinal cylindrical side wall (2015) which is further attached to disk shaped bottom tube support wall (2084) and disk shaped separator wall (2214). Each of the top end wall (2017), the longitudinal cylindrical side wall (2015), the disk shaped bottom tube support wall (2084) and the disk shaped separator wall (2114), collectively form the hot zone enclosure walls (115). As noted above, each of the hot zone enclosure walls is fabricated from one or more of copper, molybdenum, aluminum copper, copper nickel alloys, or a combination thereof such that the entire hot zone enclosure wall structure (115) forms a continuous thermally conductive path having a coefficient of thermal conductivity between about 100 and 300 W/(m° K), and preferably above 200 W/(m° K). Additionally where surfaces of any of the hot zone enclosure walls are exposed to an oxygen rich environment the wall surfaces are preferably nickel coated to prevent oxidation.

In the case of the three disk-shaped walls, (2017, 2084, and 2214), each of these walls is configured to provide a thermal mass that is capable of absorbing and redistributing thermal energy to other regions of the hot zone enclosure walls by thermal conduction and by reemitting the absorbed thermal energy to cooler areas surrounding each disk-shaped wall such as into the fuel inlet manifold (2055), the cathode chamber (2010), the combustion chamber (2135) and the recuperator chamber (2210). Thus as the top end wall (2017) is heated by combustion inside cold start combustion chamber (2300) thermal energy is absorbed by the top end wall and rapidly conducted to all regions of the hot zone enclosure walls (2017), 2015, 2084, and 2214) until the entire hot zone enclosure wall assembly reaches an equilibrium temperature. Moreover as thermal energy is absorbed or emitted by the hot zone enclosure walls its equilibrium temperature varies substantially uniformly across all regions of the hot zone enclosure walls due to its high thermal conductivity.

Thus, during the startup period at least a portion of the thermal energy generated by combustion of fuel in the cold start combustion chamber (2300) is absorbed by top end wall (2017). A further portion is absorbed by the longitudinal cylindrical sidewall (2015) as the hot exhaust gas flows through the air gap (2155) to the system exit port (2165). As the temperature of the top end wall (2017) increases, the top end wall (2017) begins to reemit thermal energy into the cooler fuel inlet manifold (2055) which serves to increase the temperature of whatever fuel air mixture is contained therein and or flowing there through.

Eventually, the temperature of the fuel air mixture inside the fuel inlet manifold (2055) reaches a reaction temperature suitable for initiating a CPDX reaction. The initial CPDX reaction occurs when the fuel air mixture having been heated to the reaction temperature makes contact with the catalyst layers (3090) proximate to the catalyzing body input or top surface located at the interface (3032) where the catalyzing body interfaces with the back end or bottom surface of the fuel reformer module (3020). Once the CPDX reaction is initiated at the output ends of some or all of the catalyst fuel passages (3085) the temperature inside each catalyst fuel passage (3085) rapidly increases along its longitudinal length spreading the CPDX reaction to the interface (3032) and the CPDX reaction becomes self-sustaining.

Once a self-sustaining CPDX reaction is achieved, the fuel input module (197) is operated to discontinue the flow of fuel air mixture to the cold start combustion chamber (2300) and to adjust the input rate of the fuel air mixture being delivered though the fuel reformer module (3020) as required to maintain the self-sustaining CPDX reaction and generate electrical power. However combustion inside the cold start combustion chamber (2300) may be continued until full power DC power output is also self-sustaining. The electronic controller (190) can become aware of the self-sustaining CPDX reaction by various sensors including temperature sensors provided on a wall of the hot zone enclosure, by the temperature sensor (3135) provided on the heat dissipating flange (3100), by a temperature sensor provided proximate to the system exhaust port (2165), by detecting a DC power signal at the DC power output module (140) and by various other sensing means.

To heat the cathode gas, the electronic controller (190) operates the air input module (198) to deliver a flow of air/cathode gas, into the air input port (2205). While this step can be taken simultaneously with igniting the cold start chamber or even before igniting the cold start chamber, it can also be delayed until a self-sustaining CPDX reaction is achieved. Preferably the initial flow rate of the incoming air being delivered through the recuperator chamber (2210) is very low and is intended to merely fill the SOFC system with a nearly stationary volume of air.

The flow of incoming air exits the cathode feed tube (2145) through the recuperator input port (2235), passes through the recuperator chamber (2210) to the recuperator output port (2235) and the exits the cathode feed tube (2145) to the cathode chamber (2010) through the plurality of air exit ports (2240). After reacting with the solid oxide cathode electrode formed on outside surfaces of each tubular fuel cell (2080) the air/cathode gas, exits the combustion chamber (2135), passing through the cathode chamber exit ports (2245) to the combustion chamber (2135) where it mixes with spent fuel air mixture and for combustion. Thereafter the combustion byproducts exit the combustion chamber through combustor exit ports (2150) to the air gap (2155) and out of the system through the system exit port (2165).

The main air heating element is the disk-shaped separator wall (2214) provided inside the recuperator chamber (2210). As described above, the disk-shaped separator wall (2214) is part of the hot zone enclosure and therefore begins to increase in temperature during the start-up phase almost concurrently with increases in temperature of the disk-shape top end wall (2017) that forms the base wall of the cold start combustion chamber (2300). Additionally the disk-shaped separator wall (2214) is thermally conductively coupled to the disk-shaped bottom tube support wall (2084) and both walls are heated by combusting the mixture of spent fuel and spent air inside the combustion chamber (2135). Thus at about the same time that the disk-shape top end wall (2017) begins to radiate enough thermal energy into the fuel input manifold (2055) to raise fuel temperature, the disk-shaped separator wall (2214) begins to radiate enough thermal energy into the recuperator chamber (2210) to raise the temperature of the incoming air. At the same time the hot zone enclosure walls are radiating thermal energy into the cathode chamber (2010) which serves to heat the air contained therein and to heat the walls of the tube shaped fuel cells of the fuel cell stack (2005). Once the CPDX reaction becomes self-sustaining the flow rate of both the incoming air and the fuel air mixture may be adjusted as required to maintain the self-sustaining CPDX reaction and to generate electrical power at desired power output amplitude.

8.8.2 Initiating an SOFC Reaction

As described above, the fuel air mixture and the incoming air/cathode gas are heated by the hot zone enclosure walls which are heated by combustion taking place inside the cold start combustion chamber (2300). Eventually a self-sustaining CPDX reaction is initiated inside the catalyst fuel passages (3085) which heats the fuel air mixture to a higher temperature and the fuel is reformed into a syngas which is capable of reacting with the solid oxide anode electrodes formed on the inside surfaces of each of the tubular fuel cells (2080). The higher temperature syngas also radiates thermal energy onto the anode electrode electrodes as it passes through the tubular fuel cells (2080). As the temperature of the anode electrode increases the cathode electrode is heated by thermal energy being radiated into the cathode chamber (2010) by the longitudinal cylindrical sidewall (2015) and heated air/cathode gas entering the cathode chamber (2010) from the recuperator chamber (2210).

Eventually the anode and cathode electrodes, the syngas and the air/cathode gas inside the cathode chamber reach a reaction temperature where DC power begins to be generated and output to the DC power terminals. Eventually the gas temperature inside the combustion chamber (2135) reaches a combustion temperature and the thermal energy generated by the combustion occurring inside the combustion chamber increases the incoming air temperature to a steady state operating temperature. In one non-limiting example operating mode, the syngas, the incoming air and the tubular fuel cells (2080) have a steady state operating temperature of between 350 and 1200° C. with a preferred operating temperature range of 800-1000° C. Meanwhile the hot zone enclosure walls (115) constantly redistribute thermal energy by thermal conduction such that the hot zone enclosure wall temperature increases and decreases substantially uniformly over all regions thereof until a steady state operating temperature is reached and then maintained.

8.8.3 Fuel Reformer Operating Mode

Referring now to FIGS. 3-4A, as described above, the fuel reformer module (3020) is at least partially thermally isolated from the cold start combustion chamber (2300) and the hot zone enclosure walls in order to prevent the fuel air mixture inside the fuel chamber (3005) from reaching its auto ignition temperature prior to entering the cylindrical catalyzing body (3030). More specifically depending on the fuel being used the fuel auto ignition temperature range is approximately 295 to 580° C. By comparison the operating temperature range of the SOFC system, again depending on fuel and electrode layer materials, is 350 to 1200° C. Additionally as pointed out above the CPDX reaction temperature range is estimated to be 900 to 1000° C.

During a cold start, the fuel air mixture (3020) enters the cylindrical fuel chamber (3005) and passes through the reactor shield base wall (3015) and then through the cylindrical catalyzing body (3032) to the fuel input manifold (3055). The fuel air mixture then flows through the tubular fuel cells and eventually out of the system. As described above, the present invention manages thermal energy generated by combustion inside the cold start combustion chamber (2300) in a manner that facilitates a greater transfer of thermal energy to the disk shaped top end wall (2017) of the hot zone enclosure than is transferred to the other cold start combustion chamber walls (2510 and 2511) and (2513). This is managed by configuring the disk shaped top end wall (2017) with a greater thermal mass than the combined thermal mass of the other walls (2510 and 2513).

More specifically, thermal energy transfer (Q) is governed by Equation 4:

$$Q = C_{th} \Delta T \qquad \text{EQU. 4}$$

where
Q=thermal energy transfer (J)
$C_{th}$=thermal mass of wall (J/° C.)
ΔT=temperature difference between the hot gas and the wall.

In the present example ΔT is approximately the same for each wall; however the thermal mass of each wall is different. The thermal mass Cth is defined as the product of wall material mass (m) in units of (g) and the specific heat capacity (μ) in units of (J/g° C.) of the material, where mass (m) is the product of wall material volume V, in units of (cm3), and the material density (ρ), in units of (g/cm³).

$$C_{th} = \rho V \mu \quad \text{EQU. 5}$$

where
ρ=material density (g/cm³)
V=material volume (cm³)
μ=material specific heat capacity of the material (J/g° C.).

In a non-limiting example embodiment the disk shaped top end wall (2017) of the hot zone enclosure comprises mostly copper and the other walls (2510), (2511) and (2513), of the intermediate enclosure surrounding the cold start combustion chamber (2300) and further surrounding the hot zone enclosure each comprises mostly Hastelloy. For copper, the specific heat capacity (μ) is 0.385 J/g° C. For Hastelloy, which is a Cobalt-Nickel-Chromium-Tungsten alloy that combines excellent high temperature strength with very good resistance to oxidizing environments up to 2000° F. (1095° C.), the specific heat capacity (μ) is 0.450 J/g° C. For copper, the density (ρ) is 8.96 g/cm³ and for Hastelloy the density (ρ) is 8.22 g/cm3. Ensuring that the top end wall (2017) absorbs more thermal energy that the other walls, proximate to the cold start chamber (2300), combined is accomplished when (Qt) of the disk shaped top end wall (2017) is greater that (Qo) of all the other walls combined which when expressed in terms of Equation 4 when the term ΔT is the same for each wall simplifies to:

$$C_{th}t > C_{th}o \text{ or } (\rho_c V t \mu_c) > (\rho_h V o \mu_h)$$

where
$C_{th}t$=thermal mass of the top end wall
$C_{th}o$=thermal mass of the other walls combined
Vt=volume of the top end wall
Vo=volume of the other walls combined
$\rho_c$=density of copper and $\rho_h$=density of Hastelloy
$\mu_c$=specific heat of copper and $\mu_h$=specific heat Hastelloy;
with the result of the present example that:

$$V_t > 1.07 V_o$$

In other words the thermal mass of the top disk shaped top end wall (2017) exceeds the thermal mass of other cold start combustion chamber walls (2510 and 2513) when the volume (Vt) of the disk shaped top end wall (2017) exceeds 1.07 times the combined volume (Vo) of the other walls (2510 and 2513). Thus according to the present invention the thermal mass of the top disk shaped top end wall (2017) exceeds the thermal mass of the intermediate enclosure walls (2510 and 2513) and preferably by 100% or more. More practically only the walls actually surrounding cold start chamber (2300) are taken into account to calculate (Vo) above. In the above example, (Vo) includes the entire volume of wall (2513) and only that portion of the wall (2510) that actually encloses the cold start chamber (2300). Using this model, the thermal mass of the wall (2513) and the portion of the wall (2510) that surrounds the cold start chamber, is exceeded by 100% when the volume of the disk shaped top end wall (2017) (Vt), is 2.14 times the volume (Vo).

As a result, more thermal energy is absorbed by the top end wall (2017) than is absorbed by all the other cold start combustion chamber walls combined. A primary advantage of this embodiment is absorbing the majority of thermal energy generated by the fuel air mixture being combusted inside the cold start combustion chamber (2300) into the top end wall (2017). Since the top end wall and the other hot zone enclosure walls are more thermally conductive than the walls (2510 and 2513) thermal energy absorbed by the top end wall is rapidly conducted by the thermally conductive path formed by hot zone enclosure walls. This is further facilitated by forming the intermediate enclosure walls (2510, 2511, and 2513) and the annular enclosure wall (7060) from Hastelloy or another high nickel content metal having a coefficient of thermal conductivity of less than about 25.0 W/(m° K) which causes a much slower conductive heat flow rate away from the hot zone enclosure walls than through the hot zone enclosure walls.

In particular during the cold start process combustion energy from the cold start chamber is primarily absorbed by the top end wall (2017) and reemitted into the fuel inlet manifold (2055) to sufficiently heat the fuel air mixture contained therein to a temperature that is high enough to initiate the CPDX reaction at the output end (3034) of the catalyst fuel passages (3085). A secondary advantage of this embodiment is that the majority of thermal energy generated by the fuel air mixture being combusted inside the cold start combustion chamber (2300) is diverted away from the fuel reformer module (3020) by instead providing a higher conductive heat flow rate from the disk shaped top end wall (2017) to the other hot zone enclosure walls (2015 and 2511) as well as to the disk shaped separator wall (2214) and the disk-shaped bottom tube support wall (2084).

Once the CPDX reaction is initiated and self-sustaining the fuel reactor body (3040) provides a thermally conductive path and sufficient thermal mass to rapidly conduct thermal energy from the reactor shield base wall (3015) to the heat dissipating flange (3100). In particular since the interface (3032) is proximate to the CPDX reaction which has a temperature of 900-1000° C., thermal energy reaches the reactor shield base wall (3015) in varying amounts by radiation, thermal conduction, and convection and is absorbed by the exposed surface (B) and the remaining solid material of the bottom surface of the reactor shield base wall (3015), as well as internal surfaces of the circular base wall fuel passages (3095) shown in FIGS. 4 and 4A. As a result the initial CPDX reaction proximate to the interface (3032) is effectively quenched to prevent auto ignition of the incoming fuel air mixture. In particular the combined surface area (B) denoted ABt potentially absorbs about 1% of the total thermal radiation emitted from all the catalyst fuel passage (3085) and the solid surface area of the reactor shield base wall at the interface, denoted AS above, potentially absorbs about 0.2% of the total thermal radiation emitted from all the catalyst fuel passage (3085) and internal surfaces of the base wall fuel passages (3095) potentially absorb about 13.6% for a combined total of about 15%.

According to the invention the thermal mass of the reactor shield base wall (3015), i.e. its volume, is formed large enough to provide sufficient energy transfer from the catalyst fuel passages (3085) to prevent over heating therein when the reactor shield base wall can be maintained at or below 100° C. Additionally according to the invention the thermal mass of the fuel reactor body (3040), i.e. its volume, is formed large enough to provide sufficient energy transfer by thermal conduction from the reactor shield base wall (3015) to the heat dissipating flange (3100) to allow the entire fuel reactor body (3040) to be maintained nearly at uniform temperature with a small thermal gradient maintained between the higher temperature reactor shield base wall and the heat dissipating flange (3100). Additionally according to the present invention the surface area of the heat dissipating flange (3100) is sufficiently large that thermal energy is dissipated therefrom at a rate equal to the rate of thermal energy being absorbed by the reactor shield base wall (3015), which as noted above is about 44 W. Additionally according to the present invention the fuel reactor body (3040) is configured to dissipate sufficient thermal therefrom to prevent the fuel air mixture passing through the cylindrical fuel chamber (3005) from exceeding an auto ignition temperature thereof. More specifically the heat dissipating flange (3100) is configured to dissipate enough thermal energy to the surrounding air to maintain the temperature of the fuel reactor body (3040) below about 295° C., equal to the lowest auto ignition temperature of expected fuel air mixtures, and preferably to maintain the temperature of the entire fuel reactor body (3040) between about 100 and 250° C. during all operating modes. Also according to the present intention, temperature of the heat dissipating flange (3100) is monitored during all operating phases and if the temperature of the heat dissipating flange exceeds a desired high temperature limit, in a range of 100 to 250° C., the input fuel air mixture may be stopped by operable elements of the fuel input module (197) to prevent fuel from entering the reformer (167) until further operation or the air moving element (3130) reduces the temperature the heat dissipating flange (3100) to a safe operating temperature.

8.9 Alternative Fuel Reformer and Outer Enclosure Embodiment

Referring now to FIGS. 2-4 and 7, an exemplary, non-limiting, alternative embodiment of an SOFC system (7000) includes an alternate embodiment of a fuel reformer module (7020) and related elements. Generally the SOFC system (7000) has substantially identical construction and similar operating modes as compared with the systems (2000 and 3000) shown in FIGS. 2-4, both described above, except that additional features and different operating modes of the system (7000) are outlined below. In order to clarify the similarity and differences between the systems the SOFC system embodiments (2000, 3000, and 7000) below, like references numbers are used when the referenced item has substantially the same structure in each of the systems (2000, 3000, and 7000).

Figure 7:
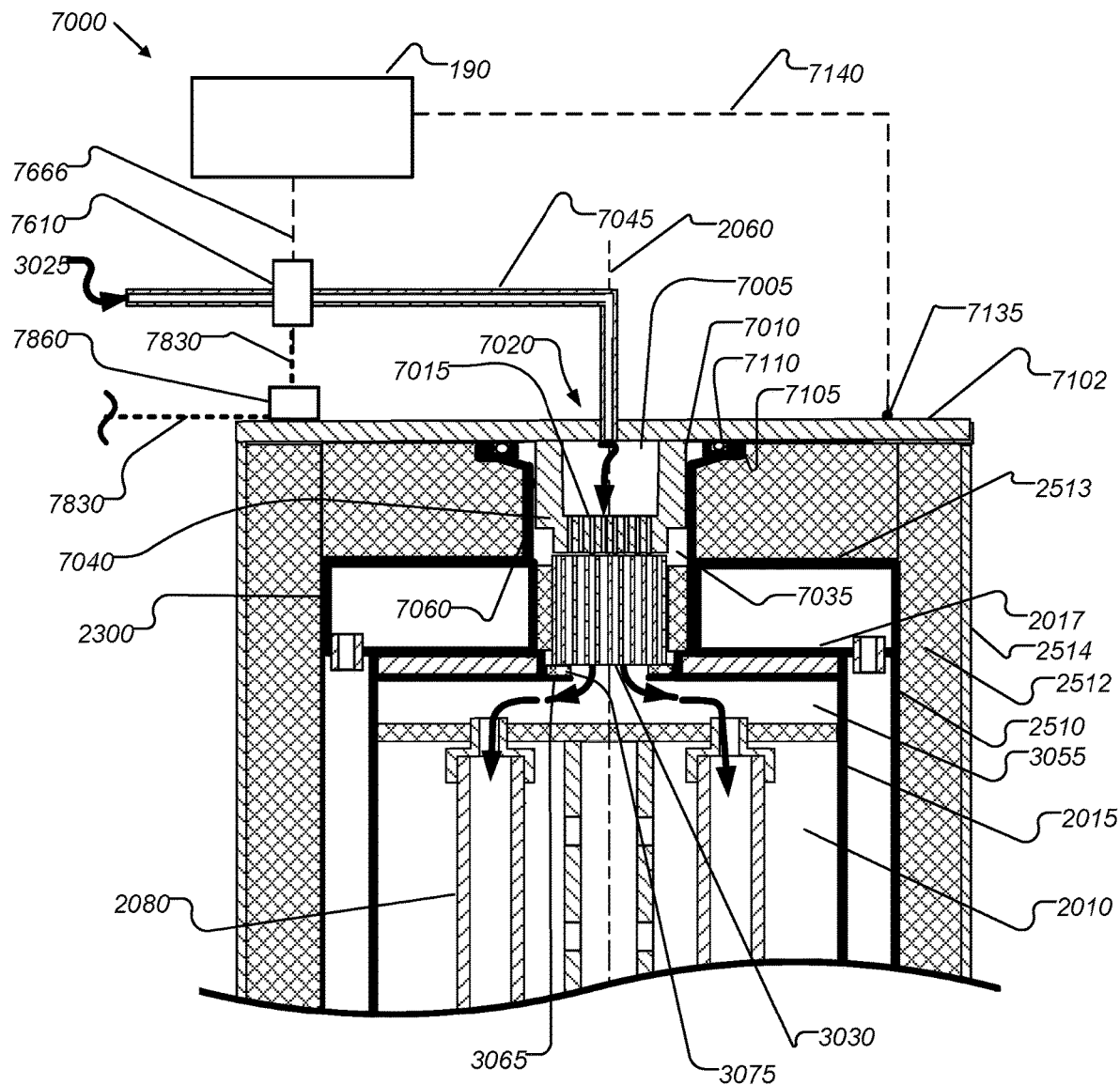
FIG. 7 depicts a schematic side section view taken through a non-limiting exemplary solid oxide fuel cell stack assembly according to the present invention.

Referring to FIG. 7 an alternate fuel reformer module (7020) includes a fuel reactor body (7040) comprising an annular perimeter wall (7010) attached to or integrally formed with a reactor shield base wall (7015). The fuel reactor body (7040) is formed to provide a cylindrical fuel chamber (7005) bounded by the annular perimeter wall (7010), the reactor shield base wall (7015) and by a disk shaped outer enclosure top end flange (7102). A fuel inlet conduit (7045) is disposed to pass through the disk shaped outer enclosure top end flange (7102) to fuel chamber (7005).

The fuel reformer module (7020) further includes a cylindrical catalyzing body (3030), described above. Each of the fuel reactor body (7040) and the cylindrical catalyzing body (3030) is installed into a cylindrical catalyzing cavity (7035) with the cylindrical catalyzing body (3030) positioned just above the fuel inlet manifold (3055) and the fuel reactor body (7040) positioned just above the cylindrical catalyzing body (3030). Each of the fuel reactor body (7040) and the cylindrical catalyzing body (3030) is configured to provide fluid communication between the cylindrical fuel chamber (7005) and the fuel inlet manifold (3055) as shown in FIGS. 4 and 4A and described above. The fuel reactor body (7040) is formed using materials that have a coefficient of thermal conductivity of greater than 100 W/(m° K) and with sufficient thermal mass to rapidly conduct thermal energy away from the interface between the reactor shield base wall (7015) and the catalyzing body (3030).

In the present non-limiting alternate embodiment of the SOFC system (7000) the cylindrical catalyzing cavity (7035) has a side wall formed by an inside diameter of the annular enclosure wall (7060). The inside diameter of the annular enclosure wall (7060) is formed with its longitudinal central axis disposed coaxial with the central longitudinal axis (2060). The cylindrical catalyzing cavity (7035) includes two open ends each forming a circular aperture with a top circular aperture facing the disk shaped outer enclosure top end flange (7102) and a bottom circular aperture facing the fuel inlet manifold (3055). The annular enclosure wall (7060) includes an annular seal plate (7105) surrounding the top circular aperture that mechanically interfaces with the disk shaped outer enclosure top end flange (7102), The annular seal plate (7105) is attached to the disk shaped outer enclosure top end flange (7102) by mechanical fasteners or the like, not shown. An O-ring seal element (7110), or the like, is disposed between the annular seal plate (7105) and the disk shaped outer enclosure top end flange (7102), e.g. in an O-ring groove, and serves to gas seal a top portion of the cylindrical catalyzing cavity (7035).

Disk shaped outer enclosure top end flange (7102) is attached to the outer cylindrical sidewall (2514) and the joint between the two elements provides a continuous thermally conductive path. Like the fuel reactor body (7040) and the other outer enclosure walls (2514) and (2518) the outer enclosure top end flange (7102) is formed from materials that have a coefficient of thermal conductivity of greater than 100 W/(m° K) and with sufficient thermal mass to rapidly conduct thermal energy from the interface between the reactor shield base wall (7015) and the catalyzing body (3030). As noted above thermal energy absorbed by the outer enclosure top end flange (7102) is rapidly conducted to the outer cylindrical wall (2514) to minimize thermal gradients from one area of the outer enclosure to another. The disk shaped outer enclosure top end flange (7102) is attached to the outer cylindrical wall (2514) by mechanical fasteners (not shown) by welding, soldering, or the like. In any case the joint formed between the top end flange (7102) and the outer cylindrical wall (2514) is gas sealed and provides a substantially continuous thermally conductive pathway.

As described above, the reactor shield based wall (7015) is configured to absorb thermal energy generated within the cylindrical catalyzing body (3030). The entire fuel reactor body (7040) is configured to provide a continuous thermally conductive path to the disk shaped top end flange (7102) in order to rapidly conduct thermal energy generated within the cylindrical catalyzing body (3030) to the disk shaped outer enclosure top end flange (7102) and from it to the cylindrical side wall (2514) and outer bottom wall (2518). Thus a change in the instantaneous temperature of reactor shield base wall (7015) is rapidly followed by a corresponding change in the temperature of the entire outer enclosure.

8.10 Thermal Energy Transfer from the Hot Zone Enclosure to the Outer Enclosure

As detailed above each wall of the outer enclosure (2514), (2518), (7102) comprises materials having a high coefficient of thermal conductivity, e.g. between 100 and 300 W/(m° K) and preferably above 140 W/(m° K). Accordingly, the outer cylindrical side wall (2514), disk shaped outer bottom wall (2518) and disk shaped outer enclosure top end flange (7102) are fabricated from one or more of copper, molybdenum, aluminum copper, copper nickel alloys, or a combination thereof. Each of the walls (2514), (2518) and (7102) preferably comprises aluminum or an aluminum alloy preferably having a coefficient of thermal conductivity above 140 W/(m° K) and each having sufficient thermal mass, i.e. thickness to rapidly conduct thermal energy throughout its volume and from one adjoining wall to another. In the present non-limiting example embodiment the outer cylindrical wall (2514) and the disk shaped outer bottom wall (2518) have a material thickness in a range of 0.5-6.5 mm (0.20-0.25 inches) and the outer enclosure top end flange (7102) has a material thickness in a range of 4.0-10.0 mm (0.16-0.39 inches); however, other thickness ranges are usable without deviating from the present invention.

Specifically, each of the outer enclosure walls (2514, 2518, 7102) is configured to provide a substantially continuous thermally conductive pathway for rapid conduction of thermal energy by thermal conduction from one area of the outer enclosure to another in order to more rapidly reduce temperature gradients between regions of the outer enclosure such that the entire outer enclosure wall structure remains substantially at the same uniform temperature throughout.

As further described above the hot zone enclosure walls (2015, 2016, and 2017) and (2214 and 2080) form a continuous thermally conductive pathway suitable for rapid thermal conduction from one area of the hot zone enclosure walls to another in order to more rapidly reduce temperature gradients between the hot zone enclosure walls and maintain the entire hot zone enclosure wall structure substantially at the same temperature. The intermediate enclosure walls (2510, 2511, and 2513) are thermally conductively coupled with the hot zone enclosure walls by the disk shaped end wall (2017). As detailed above each of the intermediate enclosure walls comprises a material having a thermal conductivity of less than about 25.0 W/(m° K), as compared with the coefficient of thermal conductivity of the hot zone enclosure walls which is 100 W/(m° K) or higher. Additionally the disc shaped walls (2017, 2084 and 2214) provide a greater thermal mass as compared with less thermal mass provided by the intermediate enclosure walls. As a result the hot zone enclosure walls absorb and conduct thermal energy at a faster rate than the intermediate enclosure walls. While the hot zone enclosure walls are thermally conductively connected to the intermediate enclosure walls by the disk shaped wall (2017), the thermal mass of the connection is purposely made small in order to slow a conductive heat flow rate across the thermally conductive path formed by the wall (2017). This provides a thermal gradient between the hot zone enclosure walls and the intermediate enclosure walls. The benefit of the thermal gradient provided between the hot zone enclosure walls and the intermediate enclosure walls is an increase in thermal radiation being emitted from the hot zone enclosure walls to more rapidly heat incoming cathode air in the recuperator chamber (2210) and air present in the cathode chamber (2010).

As further detailed above each wall of the outer enclosure (2514, 2518, and 7102) comprises materials having a high coefficient of thermal conductivity, e.g. between 100 and 300 W/(m° K) and preferably above 140 W/(m° K). Accordingly, the outer cylindrical side wall (2514), disk shaped outer bottom wall (2518) and disk shaped outer enclosure top end flange (7102) are fabricated from one or more of copper, molybdenum, aluminum, nickel or alloys thereof. In one non-limiting embodiment the walls (2514, 2518, 2516 and 7102) preferably comprises aluminum or an aluminum alloy preferably having a coefficient of thermal conductivity above 140 W/(m° K). Additionally each of the walls (2514, 2518, 2516, and 7102) is formed with sufficient thermal mass, i.e. thickness or total volume, to rapidly conduct thermal energy throughout its volume, e.g. from one adjoining outer enclosure wall to another. In the present non-limiting example embodiment shown in FIGS. 3 and 7, the outer enclosure walls (2514 and 2518) have a material thickness in a range of 0.5-6.5 mm (0.02-0.25 inches) and the wall (7102) has a material thickness in a range of 4.0-10.0 mm (0.16-0.39 inches; however other thickness ranges are usable without deviating from the present invention. In the present non-limiting example embodiment shown in FIGS. 2 and 7, the hot zone walls (2015) and (2016) have a material thickness in a range of 0.5-13 mm (0.02-0.5 inches), however other thickness ranges are usable without deviating from the present invention.

A layer of thermal insulation (2512) is disposed between outside surfaces of the intermediate enclosure walls and the inside surfaces of outer enclosure walls. Preferably, the layer of thermal insulation (2512) is constructed to ensure that surfaces of the outer cylindrical side wall (2514), the disk shaped outer bottom wall (2518), and the disk shaped outer enclosure top end flange (7102) remain within a desired operating temperature range e.g. 95-110° C.

The annular enclosure wall (7060) comprises a high temperature resistant material such as Hastelloy or Monel which each have a high nickel content to resist oxidation damage and which each have suitable service temperatures ratings, e.g. exceeding 400° C. However both Hastelloy and Monel have a coefficient of thermal conductivity of less than about 25.0 W/(m° K). Additionally the annular enclosure wall (7060) is formed with a wall thickness in the range of 0.02 to 0.1 inches, but in any case, the thickness of the annular enclosure wall (7060) is selected to provide a lower thermal mass than a thermal mass of the thermally conductive walls of the hot zone enclosure in order to reduce the relative thermal mass of the annular enclosure wall (7060) as compared to the thermal mass of the hot zone enclosure walls and the intermediate enclosure walls. Thus, due to its lower thermal conductivity and reduced thermal mass, the annular enclosure wall (7060) resists conductive thermal energy transfer between the hot zone enclosure walls and the outer enclosure walls in order to maintain a thermal gradient between the hot zone enclosure walls and the outer enclosure walls. However, this resistance to conductive thermal energy transfer by the annular enclosure wall (7060) merely reduces the rate of thermal conductance or the heat flow rate from higher temperature hot zone enclosure walls to the lower temperature outer enclosure walls. More specifically the configuration of the annular enclosure wall (7060) provides a thermal gradient between the hot zone enclosure walls and the hot zone enclosure walls.

8.11 Over-Temperature Protection System

Potentially dangerous and harmful over temperature conditions can occur due to excessive heat generation at various locations within the SOFC system (7000). During operation over temperature conditions can occur in the cell stack (2005), within cylindrical catalyzing body (7030) and at other locations such as inside or proximate to the combustion chamber (2135), inside or proximate to the cold start combustion chamber (2300) and or inside the air gap (2155).

Over temperature conditions can escalate rapidly and lead to a catastrophic failure such destruction of the SOFC fuel cells and or an explosion or fire. An over temperature condition often leads to a burn through wherein metal walls are partially melted or otherwise damaged and the insulation layer (2512) is destroyed or rendered permanently less effective. A catastrophic failure may include fuel combustion within the cylindrical fuel chamber (3005) where fuel combustion is not intended to occur. Thus when an over temperature condition occurs anywhere with the SOFC system it is desirable to stop fuel from entering into to the SOFC system (7000) as quickly as possible before the over temperature condition leads to a catastrophic failure or causes damage to the SOFC system.

Conventional SOFC systems monitor internal temperatures using internal temperature sensors. Temperate sensors are positioned inside the SOFC system proximate to critical areas where an over-temperature or an under-temperature condition can adversely affect the performance of the SOFC system. Each internal temperature sensor is in communication with an electronic controller over a wire communication interface. The electronic controller interprets temperature signals received from internal temperature sensors and runs software or other logical process steps to monitor and log temperature sensor inputs. Generally the electronic controller (190) stores temperature limit ranges in a memory module wherein each temperature limit range relates to a different operating mode and or a different internal sensor location. One problem with internal temperature sensors is that if they fail they are not easy to replace. Additionally internal temperature sensors of an SOFC system are in a high temperature and often contaminated environment that can reduce the useful life of the sensors. There is a need in the art to use external temperature sensors to determine SOFC temperature levels and preferably to a single external temperature sensor to determine a single instantaneous SOFC surface temperature that can be used to trigger various SOFC system process controls.

According to the present invention process controls can be triggered by changes in a temperature being monitored by a single external temperature sensor. In one example embodiment described above the operation of the air moving device (3130) shown in FIG. 3 is responsive to variations in temperature of an external surface of the SOFC system (3000). In particular, the electronic controller (190) using temperature sensor signals from an external temperature sensor (3135) toggles the air moving device (3130) on or off in response to instantaneous temperature variation as indicated by the external temperature sensor (3135).

Referring to FIG. 7 the SOFC system (7000) includes an external temperature sensor (7135) mounted in contact with an external surface of the disk shaped outer enclosure top end flange (7102). Alternately the external temperature sensor (7135) can be mounted in contact with any external surface of the outer enclosure walls. The external temperature sensing element (7135) is in communication with the electronic controller (190) and delivers a temperature signal to the electronic controller (190) over a communication pathway (7140). In various embodiments the SOFC system (7000) may also be equipped with the air moving element (3130), shown in FIG. 3 and described above, which is operable by the electronic controller (190) to move air over the disk shaped outer enclosure top end flange (7102) in order to reduce its temperature.

In an example operating mode the electronic controller (190) receives temperature signals from the external temperature sensing element (7135) over communication pathway (7140) and determines an instantaneous temperature of the external surface that the external temperature sensing element is mounted to. If the instantaneous temperature is not within an expected temperature range, the electronic controller is programmed to use software and or other logical operators to carry out various operating procedures in response to out of range instantaneous temperature values.

In a first instance the SOFC system is operating in a normal operating mode generating DC output power and with a steady uniform flow of input fuel air mixture entering the fuel chamber (7005) from the fuel input module (197), shown in FIG. 1.

Fuel input module (197) includes an operable fuel supply valve (7610). The operable fuel supply valve is disposed along the fuel input conduit (7045) between a fuel source and the fuel reformer (7020). The operable fuel supply valve is in communication with the electronic controller (190) over a communication channel (7666) and with an electrical power source, not shown, over a power conduit (7830). The operable fuel supply valve (7610) has a default state wherein the valve is closed, e.g. held closed by a spring force, or the like. The valve is operated by the electronic controller (190) to open by overcoming the spring force when a power signal is applied to an actuator incorporated within or otherwise associated with the valve.

In one non-limiting embodiment the electronic controller (190) causes a power signal to be applied to the valve actuator to overcome the spring force and open the fuel supply valve (7610). Depending on an amplitude of the power signal the valve may be opened slightly, e.g. at a threshold power signal amplitude, or the valve may be fully opened, e.g. at a maximum power signal amplitude. In operation, the electronic controller (190) is operable to vary the power signal amplitude in a manner that moves the valve actuator to various open positions ranging between slightly or partially open to fully opened in response to changes in the amplitude of the power signal being delivered to the valve actuator. The electronic controller (190) operates to modulate a mass or volume flow rate of the fuel air mixture (3025) that is passing through the input conduit (7045) into cylindrical fuel chamber (7005) by varying the amplitude of the power signal on the power conduit (7830).

In an operating mode of the present invention, the electronic controller (190) monitors the external temperature sensing element (7102) to determine an instantaneous temperature of the disk shaped top end flange (7102). A software program or other logical operators operating on the electronic controller (190) compares the measured instantaneous temperature of the top end flange with a temperature range associated with the current operating mode of the SOFC system. Temperature ranges for different operating modes are stored on a memory associated with the electronic controller (190). Non-limiting example operating modes include a startup operating mode when the cold start combustion chamber (2300) is in use, a steady state operating mode wherein the cold start combustion chamber is not in use and others wherein an input flow rate of incoming fuel is modulated to provide more or less DC power output from the fuel stack.

In each case if the instantaneous temperature sensed by the external temperature sensing element (7102) is within the temperature range expected the electronic controller takes no action. However if the instantaneous temperature sensed by the external temperature sensing element (7102), i.e. the temperature of the top end flange (7102) is not within the temperature range expected actions may be taken by the electronic controller (190).

As a safety feature the expected temperature range for any of the operating modes has an upper limit called the "controller failsafe temperature". In the present non-limiting example operating mode the controller failsafe temperature is 140° C. In particular if the instantaneous temperature measured by the external sensor (7135) is 140° C. or higher the electronic controller initiates a safety shut down procedure than at least includes de-energizing the operable fuel supply valve (7610) actuator to prevent any further fuel flow into the SOFC system.

Once the controller failsafe temperature is sensed, the electronic controller initiates software or logically controlled shutdown process that includes commanding the fuel delivery module (197) to close the fuel supply valve (7610) by cutting power thereto. Additionally the controlled shut down process may include ceasing fuel delivery to the cold start combustion chamber (2300), ceasing air input by the air input module (198) and actuating the air moving device (3210), if the SOFC system is so equipped and if the air moving device is not already operating.

More generally, due to the thermally conductive pathway and relatively high thermal conductivity provided by the improved outer enclosure of the present invention a single external temperature sensing element (7135) positioned on any surface of the outer enclosure eccentrically senses an instantaneous temperature of the entire outer enclosure walls (132).

In a further aspect of the present invention a thermal fuse (7860) that includes a fusible link is disposed in contact with an outside surface of the disk shaped outer enclosure top end flange (7102), or in contact with any outer surface of the outer enclosure. The thermal fuse (7860) is disposed along the fuel supply power conduit (7830) between the power supply of source and the operable fuel supply valve (7610). The thermal fuse (7860) is a passive device and independent of the electronic controller (190). The thermal fuse is configured to interrupt electrical power passing from the supply valve power source, not shown, to the operable fuel supply valve (7610) when the fusible link melts and causes a short circuit inside the thermal fuse (7860). The fusible link has a specific melting temperature that is equal to a system failsafe temperature. In the present non-limiting example embodiment, the system failsafe temperature is equal to a temperature greater than the controller failsafe temperature. In one non-limiting exemplary operating mode the system failsafe temperature is 180° C. In particular if the temperature of the fusible link reaches the system failsafe temperature of 180° C. the fusible links melts and this causes a short circuit across the thermal fuse (7860). The short circuit cause a zero power amplitude at the operable valve (7610) which closes. Thus fuel flow to the fuel chamber (7005) is prevented. In an exemplary, non-limiting embodiment, thermal fuse (7860) includes a commercially available thermal fuse, e.g., any one of Tamura LE series, NEC Sefuse SF series, Microtemp G4A series, and Hosho Elmwood D series thermal fuses wherein the selected fuse is configured with a fusible link that melts at the desired system failsafe temperature.

As set forth above, the system (7000) includes the electronic controller (190) which is operable to carry out a software or logical shut down procedure when the single external temperature sensor (7135) reports an instantaneous temperature equal to the controller failsafe temperature. The software or logical shut down procedure at least includes causing the operable fuel supply valve (7610) to close using logical commands. Meanwhile in the event that the fusible link of thermal fuse (7860) reaches the system fails safe temperature the thermal fuse prevents power from reaching the operable fuel supply valve (7610) such that fuel flow to the fuel chamber is stopped in the event that the fuel flow was not previously stopped by the software or logical shut down procedure.

As noted above because each of the outer enclosure walls (2514, 2518, and 7102) is configured to provide a thermally conductive pathway with a high coefficient of thermal conductivity the entire outer enclosure wall structure rapidly reaches thermal equilibrium at substantially at the same instantaneous temperature. Accordingly the temperature sensing elements (7135) and the thermal fuse (7860) can be positioned on any outside surface of the outer enclosure including on different outside surfaces of the outer enclosure. Moreover, as detailed above, the instantaneous temperature of the outer enclosure increases and decreases in response to increases and decreases in the temperature of the hot zone enclosure walls which are thermally conductively connected over the annular enclosure wall (7060). Thus any prolonged increase in instantaneous temperature at any location within the SOFC system (7000) ultimately leads to an increase in temperature of the outer enclosure walls which is then detected by the external temperature sensing element (7135) and monitored by the electronic controller (190).

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. a solid oxide fuel system that includes a fuel reformer module carrying out an exothermic reaction to reform combustible fuels housed therein), those skilled in the art will recognize that its usefulness is not limited thereto and that the present invention can be beneficially utilized in any number of environments and implementations where it is desirable to manage thermal energy in high temperature corrosive environments where flammable materials are processed. Accordingly, the claims set forth below should be construed in view of the full breadth and spirit of the invention as disclosed herein.

The invention claimed is:

1. A solid oxide fuel cell (SOFC) system comprising:
an SOFC stack operating in a hot zone cavity;
a plurality of hot zone enclosure walls, enclosing the hot zone cavity formed as a first thermally conductive pathway, wherein the first thermally conductive pathway comprises one or more materials having a coefficient of thermal conductivity of 100 W/(m° K) or more at temperatures above 350° C.;
a plurality of outer enclosure walls, enclosing a region surrounding the hot zone enclosure walls, formed as a third thermally conductive pathway, wherein the third thermally conductive pathway comprises one or more materials having a coefficient of thermal conductivity of 100 W/(m° K) or more at temperatures above 350° C.;
one or more catalyzing cavity enclosure walls, enclosing a catalyzing cavity, formed as a fourth thermally conductive pathway wherein the fourth thermally conductive pathway is joined together and thermally conductively coupled with each of, the first thermally conductive pathway and the third thermally conductive pathway and wherein the one or more catalyzing cavity enclosure walls is made from a material having a coefficient of thermal conductivity of 50 W/(m° K) or less at temperatures above 350° C.

2. The solid oxide fuel cell of claim 1 wherein the each of the outer enclosure walls comprises an aluminum alloy having a coefficient of thermal conductivity of 140 W/(m° K) or more at temperatures above 350° C.

3. The solid oxide fuel cell of claim 1 wherein the hot zone enclosure walls comprise copper and anyone of molybdenum, aluminum and nickel.

4. The solid oxide fuel cell of claim 1 wherein surfaces of the hot zone enclosure walls that are exposed to an oxygen rich environment are coated with a protective layer to prevent oxidation.

5. The solid oxide fuel cell (SOFC) system of claim 1 further comprising:
an electronic controller comprising a digital data processor and associated digital data memory having one or more operating programs and digital logic control elements operating thereon;
a fuel input module comprising a hydrocarbon fuel supply, a fuel inlet conduit leading to a hydrocarbon fuel reformer configured to deliver a reformed hydrocarbon fuel to the SOFC stack, and a fuel supply valve, disposed along the fuel inlet conduit, operable by the electronic controller to open the fuel supply valve to deliver a flow of fuel to the fuel reformer and to close the fuel supply valve to prevent a flow of fuel from entering the fuel reformer; and
a thermal sensor, mounted to an external surface of one of the plurality of outer enclosure walls, operable to communicate a temperature signal, corresponding with a temperature of the external surface proximate to the thermal sensor, to the electronic controller;
wherein the electronic controller using one of the operating programs and digital logic control elements is operable to close the fuel valve when the thermal sensor indicates its temperature equals or exceeds a controller fail safe temperature stored in the memory.

6. The solid oxide fuel cell (SOFC) system of claim 5 further comprising:
a thermal fuse mounted to an external surface of one of the plurality of outer enclosure walls comprising a fusible link configured to melt when the temperature of the fusible link equals or exceeds a system fail safe temperature;
wherein the fusible link is electrically connected between a power source and the fuel supply valve;
wherein melting of the fusible link prevents power from reaching the fuel supply valve thereby causing the fuel supply valve to close.

7. The solid oxide fuel cell (SOFC) system of claim 1 wherein the plurality of outer enclosure walls comprises an open ended outer cylindrical side wall joined together with a disk shaped outer bottom wall and an opposing disk shaped top end flange.

8. The solid oxide fuel cell (SOFC) system of claim 1 further comprising a fuel reformer module disposed within the cylindrical catalyzing cavity wherein the fuel reformer module comprises:
a fuel reactor body comprising a perimeter wall surrounding a fuel chamber and a reactor shield base wall attached to the perimeter wall, wherein the reactor shield base wall includes a plurality of base wall fuel passages extending there through, wherein fuel received into the fuel chamber exits the fuel chamber through the plurality of base wall fuel passages and passes therefrom to a catalyzing body;
wherein the fuel reactor body is formed from a material having a coefficient of thermal conductivity of 140 W/(m° K) or greater at temperatures above 350° C. and wherein the perimeter wall is thermally conductively coupled to one of the plurality of outer enclosure walls.

9. The solid oxide fuel cell (SOFC) system of claim 1 further comprising:
an intermediate enclosure, enclosing a region surrounding the plurality of hot zone enclosure walls, disposed between the hot zone enclosure walls and the outer enclosure walls, comprising a plurality of intermediate enclosure walls joined together to form a second continuous thermally conductive pathway comprising materials having a coefficient of thermal conductivity of 50 W/(m° K) or less, at temperatures above 350° C., wherein the second continuous thermally conductive pathway is joined together and thermally conductively coupled with the outer enclosure walls that form the third thermally conductive pathway and with the one or more catalyzing cavity enclosure walls that forms the fourth thermally conductive pathway.

10. A solid oxide fuel cell (SOFC) system comprising:
an SOFC stack operating in a hot zone cavity;
a hot zone enclosure enclosing the hot zone cavity comprising a plurality of hot zone enclosure walls joined together to form a first continuous thermally conductive pathway comprising materials having a coefficient of thermal conductivity of 140 W/(m° K) or more at temperatures above 350° C.;
an intermediate enclosure enclosing a region surrounding the hot zone enclosure walls comprising a plurality of intermediate enclosure walls joined together to form a second continuous thermally conductive pathway comprising materials having a coefficient of thermal conductivity of 25 W/(m° K) or less at temperatures above 350° C.;
an outer enclosure enclosing a region surrounding the intermediate enclosure walls comprising a plurality of outer enclosure walls joined together to form a third continuous thermally conductive pathway comprising materials having a coefficient of thermal conductivity of 140 W/(m° K) or more at temperatures above 350° C.;
a thermal insulation layer surrounding the intermediate enclosure walls disposed between outside surfaces of the intermediate enclosure that forms the second continuous thermally conductive pathway and inside surfaces of the outer enclosure that forms the third continuous thermally conductive pathway;
an air gap formed between outside surfaces of the hot zone enclosure walls forming the first continuous thermally conductive pathway and inside surfaces of the intermediate enclosure walls forming the second continuous thermally conductive pathway; and
an annular catalyzing cavity enclosure wall enclosing a catalyzing cavity formed as a fourth continuous thermally conductive pathway comprising materials having a coefficient of thermal conductivity of 25 W/(m° K) or less at temperatures above 350° C., joined together with and thermally conductively connected to each of the first continuous thermally conductive pathway, the second continuously conductive pathway, and the third continuously conductive pathway.

11. The solid oxide fuel cell (SOFC) system of claim 10 wherein the first continuous thermally conductive pathway, the second continuous thermally conductive pathway, the third continuous thermally conductive pathway and the fourth thermally conductive pathway each have a different thermal mass and wherein a thermal mass of the fourth continuous thermally conductive pathway is less than a thermal mass of any of the first continuous thermally conductive pathway, the second continuous thermally conductive pathway, and the third continuous thermally conductive pathway.

12. The solid oxide fuel cell (SOFC) system of claim 10 wherein the outer enclosure walls that form the third continuous thermally conductive pathway are formed by enclosure walls made of an aluminum alloy.

13. The solid oxide fuel cell (SOFC) system of claim 12 wherein the aluminum alloy is aluminum 6061.

14. The solid oxide fuel cell (SOFC) system of claim 10 wherein the hot zone enclosure walls that form the first thermally conductive pathway comprises at least one wall portion formed from a material having a coefficient of thermal conductivity of 200 W/(m° K) or greater at temperatures above 350° C.

15. The solid oxide fuel cell (SOFC) system of claim 14 wherein the at least one hot zone enclosure wall portion is formed from an alloy comprising copper and any one of: molybdenum, aluminum, and nickel.

16. The solid oxide fuel cell (SOFC) system of claim 10 wherein the hot zone enclosure walls that form the first continuous thermally conductive pathway comprise copper and any one of molybdenum, aluminum, and nickel wherein surfaces of the hot zone enclosure walls that are exposed to an oxygen rich environment include a protective coating applied thereon to prevent oxidation.

17. The solid oxide fuel cell (SOFC) system of claim 8 wherein the fuel reactor body is formed from an aluminum alloy and wherein exposed surfaces of the fuel reactor body are uncoated.

18. The solid oxide fuel cell (SOFC) system of claim 8:
wherein the catalyzing body comprises a solid non-porous ceramic substrate formed to include a plurality of catalyst fuel passages passing longitudinally therethrough with each catalyst fuel passage including a catalyst coating provided on an inside surface thereof;
wherein the catalyst coating is selected to initiate an exothermic reaction with a hydrocarbon fuel that passes through each catalyst fuel passage;
wherein each of the plurality of base wall fuel passages is longitudinally aligned with a corresponding one of one of the plurality of catalyst fuel passages such that the hydrocarbon fuel exiting from each of the plurality of base wall fuel passages enters a corresponding one of the plurality of catalyst fuel passages that is longitudinally aligned therewith;
wherein each of the plurality of base wall fuel passages is substantially identical and has a substantially constant circular cross-sectional area along its longitudinal length;
wherein each of the plurality of catalyst fuel passages is substantially identical and has a substantially constant square cross-sectional area along its longitudinal length; and,
wherein a ratio of the circular cross-sectional area of each circular base wall fuel passage to the square cross-sectional area of each square catalyst fuel passage is between 0.6 and 0.9.

19. The solid oxide fuel cell (SOFC) system of claim 9 further comprising:
a thermal insulation layer disposed between the outer enclosure and the intermediate enclosure in mating contact with inside surfaces of the outer enclosure walls;
an air gap formed between the intermediate enclosure and the hot zone enclosure, wherein the air gap comprises an exhaust fluid conduit in fluid communication with each of the hot zone enclosure and a system exhaust port.

20. The solid oxide fuel cell (SOFC) system of claim 1 wherein each of the first continuous thermally conductive pathway, the third continuous thermally conductive pathway, and the fourth thermally conductive pathway have a different thermal mass and wherein a thermal mass of the fourth continuous thermally conductive pathway is less than a thermal mass of either of the first continuous thermally conductive pathway and the third continuous thermally conductive pathway.

21. The solid oxide fuel cell (SOFC) system of claim 1 wherein the plurality of hot zone enclosure walls comprises:
an open ended cylindrical longitudinal side wall joined together with a disk-shaped bottom end wall and an opposing disk-shaped top end wall;
wherein each of the bottom end wall and the top end wall includes, a disk-shaped core element, having a core thickness of 0.5 to 6.5 mm, fabricated from one of: copper alone, molybdenum alone, an aluminum copper alloy, and a nickel copper alloy.

22. The solid oxide fuel cell (SOFC) system of claim 21 wherein each of the disk-shaped bottom end wall and the opposing disk-shaped top end wall includes a protective coating applied onto surfaces thereof that are exposed to an oxygen rich environment to prevent oxidation thereof.

* * * * *